(12) United States Patent
Takahashi et al.

(10) Patent No.: US 10,454,577 B2
(45) Date of Patent: Oct. 22, 2019

(54) FREE SPACE OPTICAL TRANSMITTER AND FREE SPACE OPTICAL COMMUNICATION METHOD

(71) Applicant: NEC CORPORATION, Tokyo (JP)

(72) Inventors: Seigo Takahashi, Tokyo (JP); Toshiharu Ito, Tokyo (JP); Kohei Hosokawa, Tokyo (JP); Manabu Arikawa, Tokyo (JP); Yoshimasa Ono, Tokyo (JP); Takashi Ishikawa, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/751,369

(22) PCT Filed: Aug. 17, 2016

(86) PCT No.: PCT/JP2016/003749
§ 371 (c)(1),
(2) Date: Feb. 8, 2018

(87) PCT Pub. No.: WO2017/029808
PCT Pub. Date: Feb. 23, 2017

(65) Prior Publication Data
US 2018/0234180 A1    Aug. 16, 2018

(30) Foreign Application Priority Data

Aug. 20, 2015  (JP) .................................. 2015-162493

(51) Int. Cl.
*H04B 10/118*  (2013.01)
*H04B 10/112*  (2013.01)
(Continued)

(52) U.S. Cl.
CPC ......... *H04B 10/116* (2013.01); *H04B 10/118* (2013.01); *H04B 10/1121* (2013.01); *H04B 10/50* (2013.01); *H04B 10/61* (2013.01)

(58) Field of Classification Search
CPC .. H04B 10/112; H04B 10/1121; H04B 10/505
See application file for complete search history.

(56) References Cited

U.S. PATENT DOCUMENTS

| 8,244,137 B1* | 8/2012 | Chen .................. H04B 10/1141 398/118 |
| 2005/0219469 A1* | 10/2005 | Chan ...................... H04B 10/50 353/31 |
| 2012/0008961 A1* | 1/2012 | Chen .................. H04B 10/1121 398/119 |

FOREIGN PATENT DOCUMENTS

| JP | 9-326761 A | 12/1997 |
| JP | 11-266252 A | 9/1999 |

(Continued)

OTHER PUBLICATIONS

Written Opinion for PCT/JP2016/003749, dated Oct. 11, 2016.
International Search Report for PCT/JP2016/003749, dated Oct. 11, 2016.

*Primary Examiner* — Shi K Li
(74) *Attorney, Agent, or Firm* — Sughrue Mion, PLLC

(57) ABSTRACT

It is difficult in a free space optical transmitter to transmit a beacon beam stably at low cost, and that it is impossible to maintain stable tracking; therefore, a free space optical transmitter according to an exemplary aspect of the present invention includes a laser beam transmitting means for transmitting a plurality of laser beams capable of interfering with each other and differing in one of an optical frequency and a time variation in a phase difference; and a wavefront control beam transmitting means for transmitting, to a free space, a plurality of wavefront control beams obtained by (Continued)

making each of the plurality of laser beams have a different wavefront.

14 Claims, 14 Drawing Sheets

(51) Int. Cl.
*H04B 10/116* (2013.01)
*H04B 10/50* (2013.01)
*H04B 10/61* (2013.01)

(56) References Cited

FOREIGN PATENT DOCUMENTS

| | | |
|---|---|---|
| JP | 2005-354335 A | 12/2005 |
| JP | 2013-535871 A | 9/2013 |
| JP | 2014-506433 A | 3/2014 |
| WO | 2013/136652 A1 | 9/2013 |

* cited by examiner

FIG. 14

| | | | |
|---|---|---|---|
| A | SIGNAL SOURCE 5110 | B1 B2 B3 B4  ←2π/Δω→ | |
| B | SIGNAL MULTIPLEXER 5120 | B1 B1 B2 B2 B3 B3 B4 B4 | INTENSITY vs FREQUENCY |
| C | TRANSMITTING -SIDE HPF 5130 | | INTENSITY vs FREQUENCY; (m−1)Δω/2π, fc |
| D | RECEIVING-SIDE TELESCOPE 1210 | B1 B1 B2 B2 B3 B3 B4 B4  ←2π/Δω→ | |
| E | SIGNAL OPTICAL RECEIVER 5210 | B1 B2 B3 B4 | INTENSITY vs FREQUENCY; Δω/2π, (m−1)Δω/2π, fc |
| F | RECEIVING-SIDE HPF 5220 | | INTENSITY vs FREQUENCY; (m−1)Δω/2π, fc |
| G | SIGNAL REGENERATOR 5230 | B1 B2 B3 B4 | |

FREE SPACE OPTICAL TRANSMITTER AND FREE SPACE OPTICAL COMMUNICATION METHOD

CROSS REFRENCE TO RELATED APPLICATIONS

This application is a National Stage of International Application No.PCT/JP 2016/003749 filed Aug. 17, 2016, claiming priority based on Japanese Patent Application No. 2015-162493 filed Aug. 20, 2015, the contents of all which are incorporated herein by reference in their entirety.

TECHNICAL FIELD

The present invention relates to free space optical transmitters and free space optical communication methods, in particular, to a free space optical transmitter and a free space optical communication method to perform optical communication using a laser light beam propagating through a free space.

BACKGROUND ART

In recent years, the amount of data to be transmitted between the ground, and an aircraft or an artificial satellite is increasing. Further, in order to implement large-capacity data communication, a free space optics (FSO) system using an optical frequency band capable of significantly increasing a band as compared with a microwave is being investigated.

Among such free space optics (FSO) systems, in an FSO system in which communication is performed between the ground and a low earth orbit (LEO) satellite, there are constraints on communication time. Consequently, it is important to stably maintain tracking with increasing a bit rate. The reason is that, if tracking cannot be maintained, the communication capacity of an FSO system is reduced because communication time is reduced by time required for recapturing.

In order to maintain stable tracking in a free space optics (FSO) system, it is necessary to transmit a beacon beam stably. In order to implement stable transmission of a beacon beam, it is necessary to solve the following two technical challenges. The first challenge is to make it possible to receive a high-sensitive beacon beam suppressing background light. The second challenge is to mitigate the impact of atmospheric turbulence on the beacon beam. Each of the challenges will be described below.

The first challenge is that it is necessary to remove reflected light from the sun, the moon, or the earth, which is called background light, from light collected by a receiving telescope. This is because, if background light is received simultaneously with a beacon beam, a receiving signal/noise (S/N) ratio of the beacon beam is lowered. Specifically, it becomes difficult to detect a high-sensitive beacon beam due to the saturation of an optical receiver or the increase in beat noise caused by background light; consequently, tracking becomes unstable.

Whereas a laser device with a narrow linewidth is used for the beacon beam as a light source, the background light has broadband continuous spectral components having their origin in sunlight. Accordingly, it is possible to improve the receiving S/N ratio of the beacon beam by blocking the spectral components of the background light using a narrowband optical band-pass filter (BPF) that lets the light with only a band of the beacon beam through.

Ideally, it is desirable to keep the passband width of the optical band-pass filter (BPF) used here as narrow as possible. However, in the free space optics (FSO) system between the ground and an artificial satellite, it is necessary to consider a frequency shift of laser light due to Doppler effect. Specifically, a normalized amount of a Doppler shift between the ground and a low earth orbit satellite is about $\pm 3 \times 10^{-5}$, for example. This results in an occurring shift amount of about $\pm 6$ GHz when using laser light having the wavelength of 1.55 micrometer (μm), that is, the frequency of about 200 terahertz (THz).

However, it is not preferable to mount, in an artificial satellite, an optical band-pass filter (BPF) that variably controls a passing center frequency following a Doppler shift because it leads to an increase in power consumption and device weight. It is therefore necessary, in order to deal with such a Doppler shift, to use an optical band-pass filter (BPF) having a passing bandwidth of about 18 GHz (wavelength width is about 0.14 nm) that is about 1.5 times as wide as a shift amount, for example, in consideration of a margin. Such an optical band-pass filter (BPF) can be obtained by combining a spatial Bragg grating filter and an etalon, for example.

Using such a narrowband optical band-pass filter (BPF) makes it possible to remove background light sufficiently and receive a beacon beam with high sensitivity. On the other hand, applying a narrowband optical band-pass filter (BPF) is a limiting condition for the spectrum of laser light used for a beacon beam.

Next, the second challenge will be described. The second challenge is that it is necessary to stabilize a variation in the received light intensity of a beacon beam that arises on a receiving side from wavefront disturbance of the beacon beam due to propagation through the atmosphere. If the intensity of a beacon beam to be received largely fades due to strong atmospheric turbulence, it becomes difficult to control a tracking precisely because an S/N ratio of an error signal detected by a tracking control system is degraded. This particularly becomes conspicuous if a beacon beam is transmitted from the ground to an artificial satellite overhead. This is because the beacon beam propagating from the ground toward an artificial satellite is strongly affected by atmospheric turbulence. That is to say, this is because the beacon beam transmitted from the ground is affected by atmospheric turbulence immediately after the transmission, propagates over a long distance in a vacuum without atmospheric turbulence maintaining a spatial intensity distribution, and is enlarged and projected on an orbital plane of the artificial satellite.

If the intensity distribution of the beacon beam is enlarged in a plane, it is impossible to obtain the aperture averaging effect in a receiving-side telescope, and the beacon beam is strongly affected by atmospheric turbulence. If strong fade occurs due to atmospheric turbulence, and a beacon disappears, the tracking control system of an artificial satellite loses a position of a ground station. As a result, it becomes impossible to radiate a signal beam accurately from the artificial satellite toward the ground, and it becomes difficult to perform stable free space optics (FSO).

A size of a spatial intensity distribution of a beacon beam will be described below using a specific example.

If it is assumed that a beacon beam propagating from the ground toward a satellite is a spherical wave, a coherence radius of the intensity distribution is expressed by following formula (1).

$$\rho_{0,sph} = \left[ 1.46k^2 \int_0^L C_n^2(z) \cdot (z/L)^{5/3} dz \right]^{-3/5} \quad (1)$$

Because formula (1) includes a propagation distance L in its numerator, the spatial size of the beacon beam intensity distribution increases as the propagation distance increases. As a result of estimating a coherence radius $\rho_{0,\,sph}$ from formula (1) using a type of Hufnagle-Valley (HV) model as typical structural parameters of the atmosphere, the result of $\rho_{0,\,sph}$=6.4 m is obtained if a typical propagation distance for a low earth orbit satellite L is set at 600 km. Given that a spatial size of the intensity distribution is equivalent to a spatial coherent radius, it is impossible to obtain the aperture averaging effect unless the diameter of a telescope on a satellite side is equal to or larger than 13 m. However, there has been the problem that mounting such a giant telescope on a satellite side increases the cost due to an increase in weight and volume.

Patent Literature 1 and Patent Literature 2 disclose examples of technologies to solve such problems caused by the atmospheric turbulence.

A multi-beam laser communication device described in Patent Literature 1 includes first to fourth telescopes for laser beam transmission, a laser pointing device, a telescope for receiving light, a gimbal mechanism to adjust an azimuth and an elevation angle for transmitting and receiving, and a controller. The controller selects a laser light source to be used depending on beam conditions to radiate a laser beam from a telescope, and adjusts a beam divergence angle of the laser beam so as to suppress a variation in received light intensity on the other side. This makes it easy to hold a laser line in an environment that there are atmospheric turbulence and a pointing error, which is described in Patent Literature 1.

Patent Literature 2 discloses a free space optical transmitter having a transmitting-side station that includes a plurality of signal light sources to radiate signal beams whose wavelengths differ from each other, a drive circuit to modulate each signal light source by an inputted electrical signal, a mirror to multiplex respective signal beams on a same optical axis, and a beam splitter. This configuration makes it possible to transmit a same signal simultaneously by a plurality of signal beams whose wavelengths differ from each other; consequently, it is possible to reduce a variation in received optical power on a receiving side as compared with a transmission using one light source, which is described in Patent Literature 2.

There is another technology described in Patent Literature 3 as related technologies.

CITATION LIST

Patent Literature

PTL 1: Japanese Unexamined Patent Application Publication No. 2005-354335
PTL 2: Japanese Unexamined Patent Application Publication No. H9-326761
PTL 3: Japanese Unexamined Patent Application Publication No. H11-266252

SUMMARY OF INVENTION

Technical Problem

The above-mentioned free space optical transmitter described in Patent Literature 1 requires an expansion of an interval of transmission beams more than a coherent radius. Specifically, it is necessary to set a diameter of a telescope or a layout interval of a plurality of telescopes at about one meter (m). However, there is the problem that using such a large optical system increases the cost.

Because the above-mentioned free space optical transmitter described in Patent Literature 2 requires use of a wide optical wavelength band, it is difficult to apply a narrowband optical band-pass filter (BPF). Consequently, there is the problem that it is difficult to receive a beacon beam with high sensitivity due to the influence of background light.

As described above, there has been the problem that it is difficult in a free space optical transmitter to transmit a beacon beam stably at low cost, and that it is impossible to maintain stable tracking.

The object of the present invention is to provide a free space optical transmitter and a free space optical communication method that solve the above-mentioned problem that it is difficult in a free space optical transmitter to transmit a beacon beam stably at low cost, and that it is impossible to maintain stable tracking.

Solution to Problem

A free space optical transmitter according to an exemplary aspect of the present invention includes a laser beam transmitting means for transmitting a plurality of laser beams capable of interfering with each other and differing in one of an optical frequency and a time variation in a phase difference; and a wavefront control beam transmitting means for transmitting, to a free space, a plurality of wavefront control beams obtained by making each of the plurality of laser beams have a different wavefront.

A free space optical communication method according to an exemplary aspect of the present invention includes in a first communication station, generating a plurality of laser beams capable of interfering with each other and differing in one of an optical frequency and a time variation of a phase difference; and transmitting, to a free space, a plurality of wavefront control beams obtained by making each of the plurality of laser beams have a different wavefront; and in a second communication station configured to communicate with the first communication station, collecting received light including a received laser beam of the wavefront control beams having propagated through the free space; extracting the received laser beam from the received light; and performing photoelectric conversion on the received laser beam.

Advantageous Effects of Invention

According to the free space optical transmitter and the free space optical communication method of the present invention, it is possible to transmit a beacon beam stably at low cost and maintain stable tracking.

BRIEF DESCRIPTION OF DRAWINGS

FIG. 14 is a diagram to describe the operation of the free space optical communication system according to the sixth example embodiment of the present invention.

EXAMPLE EMBODIMENT

Example embodiments of the present invention will be described below with reference to the drawings.

[First Example Embodiment]

Figure 1:
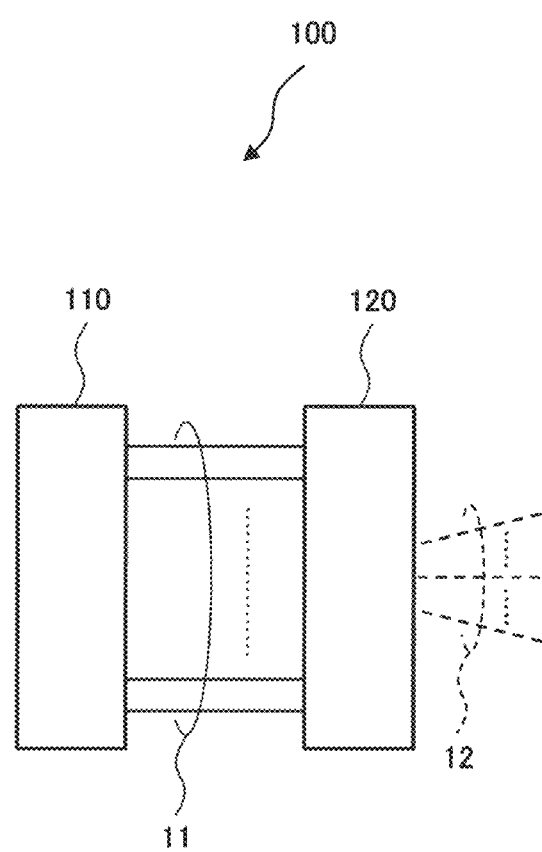
FIG. 1 is a block diagram illustrating a configuration of a free space optical transmitter according to a first example embodiment of the present invention.

FIG. 1 is a block diagram illustrating a configuration of a free space optical transmitter 100 according to the first example embodiment of the present invention. The free space optical transmitter 100 includes a laser beam transmitting means 110 and a wavefront control beam transmitting means 120.

The laser beam transmitting means 110 transmits a plurality of laser beams 11 capable of interfering with each other and differing in one of an optical frequency and a time variation in a phase difference. The wavefront control beam transmitting means 120 transmits, to a free space, a plurality of wavefront control beams 12 obtained by making each of the plurality of laser beams 11 have a different wavefront.

Because each of the plurality of wavefront control beams 12 has a different wavefront, it undergoes a different disturbance in the process of passing through the atmospheric turbulence in the free space. As a result, the light intensities of the respective wavefront control beams 12 fade at a different timing on a receiving side.

Because the plurality of wavefront control beams are composed of a plurality of laser beams that are capable of interfering and differ in optical frequency, the plurality of wavefront control beams interfere with each other on the receiving side. Consequently, the intensity of received light varies with a period of a difference frequency that is a difference in optical frequency between the plurality of laser beams. In this case, by removing a difference frequency component from a signal of the received light, a received signal can be obtained in which the fade is mitigated by a statistical multiplexing effect obtained by overlapping the plurality of wavefront control beams. This makes it possible to receive a stable laser beam.

It is possible to use the laser beam composed of the plurality of wavefront control beams as a beacon beam in the free space optical communication. One of the difference frequency that is a difference in optical frequency between the above-mentioned plurality of laser beams and the frequency of the variation in phase difference can be set at a frequency larger than the frequency of atmospheric turbulence in the free space.

As described above, according to the free space optical transmitter 100 of the present example embodiment, it is possible to transmit a beacon beam stably at low cost and maintain stable tracking.

[Second Example Embodiment]

Figure 2:
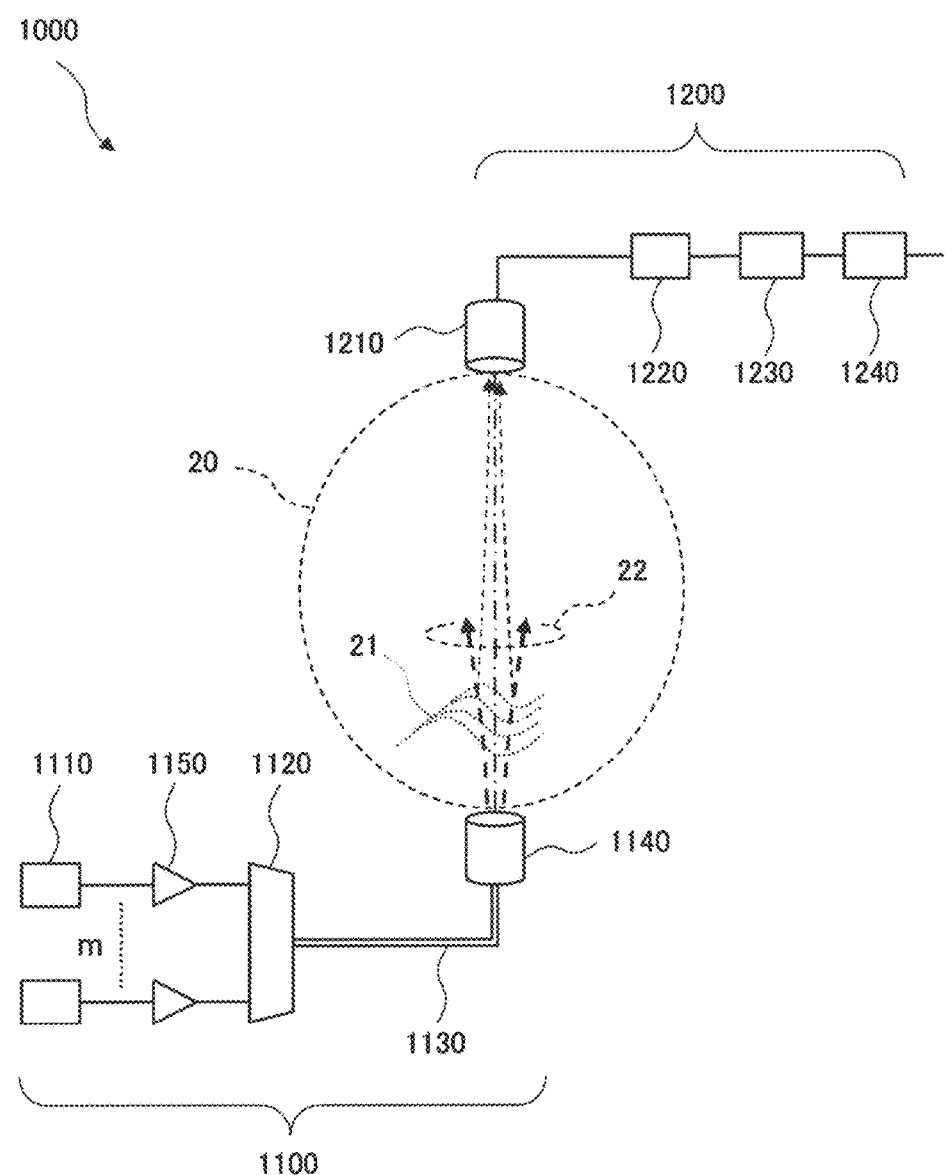
FIG. 2 is a block diagram illustrating a configuration of a free space optical communication system according to a second example embodiment of the present invention.

Next, a second example embodiment of the present invention will be described. FIG. 2 is a block diagram illustrating a configuration of a free space optical communication system 1000 according to the second example embodiment of the present invention. The free space optical communication system 1000 includes a free space optical transmitter 1100 and a free space optical receiver 1200, and transmits a laser beam through a free space 20. The free space optical communication system 1000 has a configuration in which the free space optical transmitter 1100 is installed on the ground, and the free space optical receiver 1200 is mounted in an artificial satellite, typically. Here, the free space 20 includes the atmosphere and also includes the outer atmosphere and a vacuum region. There is atmospheric turbulence 21 in the atmospheric region.

The free space optical transmitter 1100 includes a laser light source 1110, a multiplexer 1120, an optical waveguide medium 1130, and a transmitting-side telescope 1140. Here, the laser light source 1110 constitutes a laser beam transmitting means, and the multiplexer 1120, the optical waveguide medium 1130, and the transmitting-side telescope 1140 constitute a wavefront control beam transmitting means.

The laser light source 1110 includes a plurality (m pieces) of laser light sources each of which outputs a laser beam with a different optical frequency. Each of the laser beams output from the laser light sources 1110 is inputted into the multiplexer 1120 through a single mode fiber (SMF). The multiplexer 1120 multiplexes m pieces of inputted laser beams and sends the multiplexed laser beams to the optical waveguide medium 1130. The multiplexed laser beams having propagated through the optical waveguide medium 1130 are transmitted as a beacon beam 22 from the transmitting-side telescope 1140 to the free space 20. The laser beams having different wavefronts (wavefront control beams) that constitute the beacon beam 22 respectively undergo different wavefront disturbances in the process of passing through the atmospheric turbulence 21.

As illustrated in FIG. 2, the free space optical transmitter 1100 may be configured to include an optical amplifier 1150 in a section where the laser light source 1110 is connected to the multiplexer 1120 by a single mode fiber (SMF).

The free space optical receiver 1200 includes a receiving-side telescope 1210 serving as a light collecting means, a narrowband band-pass filter (BPF) 1220 serving as an optical band-pass means, and an optical receiver 1230 serving as an optical receiving means.

The receiving-side telescope 1210 collects received light including received laser beams of wavefront control beams having propagated through the free space 20. The narrowband band-pass filter (BPF) 1220 lets the received laser beams among the received light through. The optical receiver 1230 performs photoelectric conversion on the received laser beams. As the optical receiver 1230, an array-type optical detector typified by a charge coupled device (CCD), a quadrant detector (QD) sensor, or the like can be used.

Next, the operation of the free space optical communication system 1000 according to the present example embodiment will be described.

As mentioned above, the free space optical transmitter 1100 transmits the beacon beam 22 composed of a plurality of laser beams having different wavefronts (wavefront control beams) to the free space 20. The beacon beam 22 (received laser beam) having reached the free space optical receiver 1200 is collected by the receiving-side telescope 1210. After an optical spectral component of background light is removed by the narrowband band-pass filter (BPF) 1220, the beacon beam 22 undergoes the photoelectric conversion by the optical receiver 1230.

Using an electrical filter circuit 1240 makes it possible to extract a predetermined frequency component of a received electrical signal obtained by the photoelectric conversion. The optical receiver 1230 may be configured to detect a tracking error of the receiving-side telescope 1210 and generate an error signal.

Figure 3:
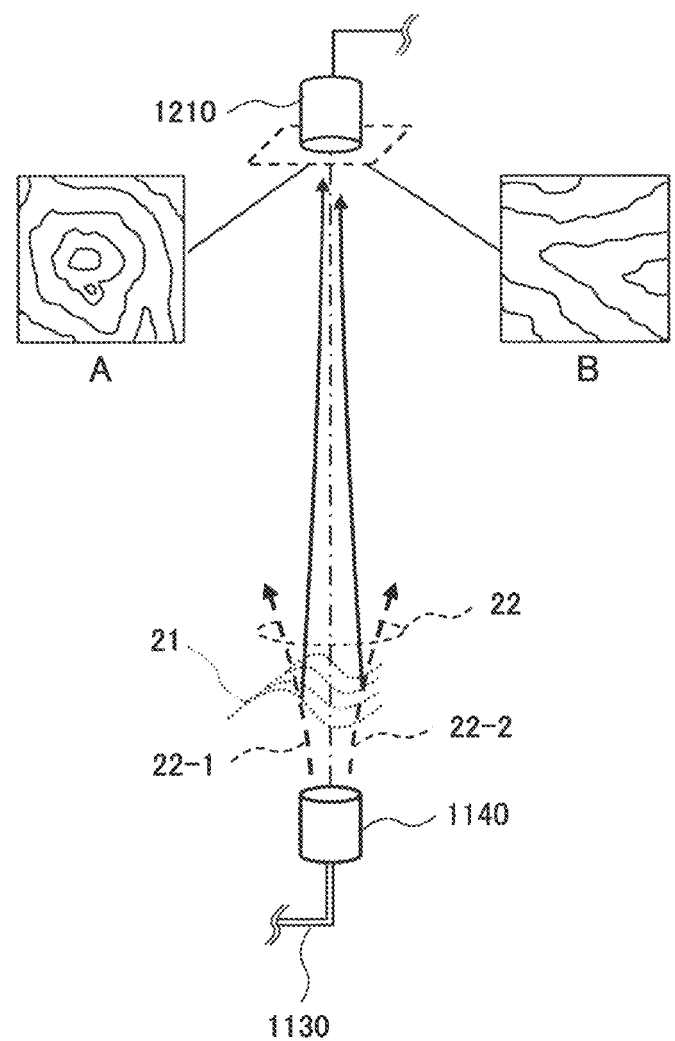
FIG. 3 is a diagram schematically illustrating a beacon beam propagating between a free space optical transmitter and a free space optical receiver constituting the free space optical communication system according to the second example embodiment of the present invention.

Next, the function effects of the free space optical communication system 1000 according to the present example embodiment will be described using FIG. 3. FIG. 3 is a diagram schematically illustrating the beacon beam 22 propagating between the free space optical transmitter and the free space optical receiver constituting the free space optical communication system 1000 according to the present example embodiment. As illustrated in FIG. 3, the beacon beam 22 propagates through the free space between the transmitting-side telescope 1140 included in the free space optical transmitter 1100 and the receiving-side telescope 1210 included in the free space optical receiver 1200.

A case will be described where the beacon beam 22 transmitted from the transmitting-side telescope 1140 includes a first laser beam 22-1 and a second laser beam 22-2 whose optical frequencies differ from each other. The first laser beam 22-1 and the second laser beam 22-2 are spatially multiplexed by orthogonal modes and propagate through the optical waveguide medium 1130. Then the first laser beam 22-1 and the second laser beam 22-2 are transmitted to the free space from the transmitting-side telescope 1140 with their wavefronts differing from each other.

The diagram A and the diagram B in FIG. 3 illustrate examples of schematic contour maps of light intensity distributions on an aperture plane of the receiving-side telescope 1210 if each of these two types of laser beams propagates through the free space separately. The laser beams 22-1 and 22-2 having two types of different wavefronts undergo different atmospheric turbulences; consequently, their intensity distributions differ from each other. In the example illustrated in FIG. 3, as illustrated in the diagram A in FIG. 3, the first laser beam 22-1 has a local maximum value of the intensity distribution near the center of the receiving-side telescope 1210. In contrast, as illustrated in the diagram B in FIG. 3, the second laser beam 22-2 has a valley of the intensity distribution near the center of the receiving-side telescope 1210, and the intensity of the laser beam has weakened near the center.

With regard to the intensity distribution of these two types of laser beams, if it is possible to add respective light intensities simply, the variation in the intensity of the light inputted into the aperture plane of the receiving-side telescope is mitigated by the statistical multiplexing effect. As a result, it is believed that stability of the received light intensity is achieved. The free space optical receiver 1200 according to the present example embodiment is configured to include the narrowband band-pass filter (BPF) 1220 and remove the optical spectral component of background light. This requires bringing the optical frequencies of two types of laser beams passing through the narrowband band-pass filter (BPF) 1220 closer to each other as compared with the passband width of the narrowband band-pass filter (BPF) 1220. Consequently, it is necessary to consider effects of the interference between these two types of laser beams.

A case will be considered where the following two settings are performed with respect to the optical frequency difference between the first laser beam 22-1 and the second laser beam 22-2. The first setting is a case where the optical frequency difference between these two types of laser beams is equal to zero. The second setting is a case where the optical frequency difference is included in the band of the optical receiver 1230, and is sufficiently higher than the frequency component of atmospheric turbulence.

If the first setting is set, the intensity distribution does not become an intensity distribution in which the intensity distributions illustrated in the diagram A and the diagram B in FIG. 3 are added because random interference occurs between these two types of laser beams. That is to say, if a large phase distribution is added due to strong atmospheric turbulence, a new variation occurs in the received light intensity of the beacon beam 22 due to the interference between these two types of laser beams.

If the second setting is set, a beat occurs due to the interference between these two types of laser beams whose optical frequencies differ from each other. If the optical frequency of the first laser beam 22-1 is expressed by $\omega_0$, and the optical frequency of the second laser beam 22-2 is expressed by $\omega_0+\Delta\omega$, the frequency of a beat that occurs becomes $\Delta\omega$. In this case, it can be configured that the difference frequency $\Delta\omega$ of an optical frequency difference between a plurality of laser beams is larger than the frequency of atmospheric turbulence in the free space. Specifically, the frequency of atmospheric turbulence ranges from one to two kilohertz (kHz), for example. This configuration enables the difference frequency $\Delta\omega$ to be made out of frequency band of the tracking control system, and the intensity distribution due to the interference between laser beams having two types of optical frequencies to be mitigated. As a result, it becomes possible to stabilize the received light intensity in the free space optical receiver 1200.

Next, the advantageous effects of the above-mentioned free space optical communication system 1000 according to the present example embodiment will be described in further detail.

Figure 4A:
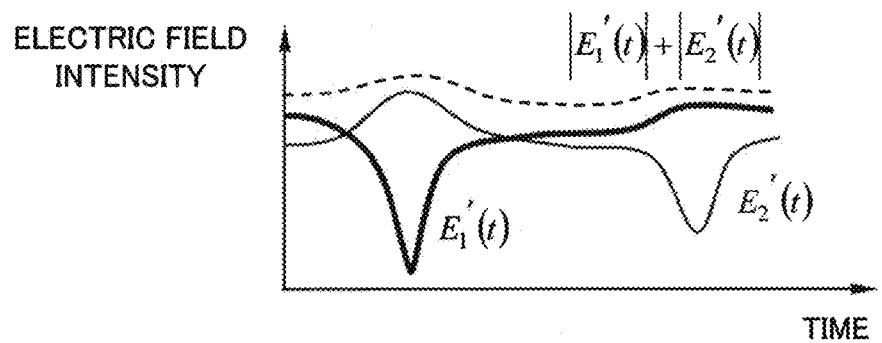
FIG. 4A is a diagram illustrating time variations of received light intensities of two types of laser beams having different optical frequencies to describe the advantageous effects of the free space optical communication system according to the second example embodiment of the present invention, and a diagram illustrating a case where respective light intensities are added.
Figure 4B:
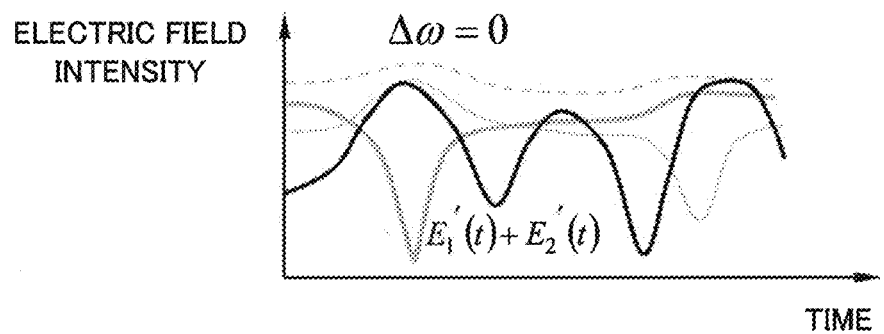
FIG. 4B is a diagram illustrating time variations of received light intensities of two types of laser beams having different optical frequencies to describe the advantageous effects of the free space optical communication system according to the second example embodiment of the present invention, and a diagram illustrating a case where a difference frequency is zero.
Figure 4C:
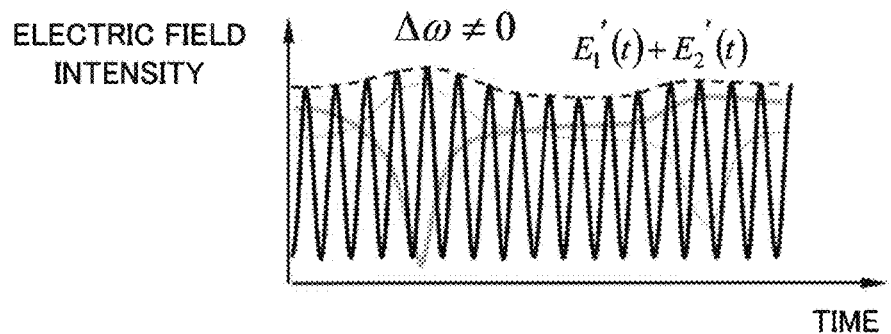
FIG. 4C is a diagram illustrating time variations of received light intensities of two types of laser beams having different optical frequencies to describe the advantageous effects of the free space optical communication system according to the second example embodiment of the present invention, and a diagram illustrating a case where a difference frequency is not zero.

FIG. 4A, FIG. 4B, and FIG. 4C illustrate time variations in received light intensities of two types of laser beams whose optical frequencies differ from each other. FIG. 4A illustrates a case where respective light intensities are simply added, FIG. 4B illustrates a case where a difference frequency is zero, and FIG. 4C illustrates a case where a difference frequency is not zero, respectively.

A wavefront of the first laser beam 22-1 is expressed by a first wavefront (WF #1), and the time variation of the electric field thereof is expressed by $E_1(t)$. A wavefront of the second laser beam 22-2 is expressed by a second wavefront (WF #2), and the time variation of the electric field thereof is expressed by $E_2(t)$. $E_1(t)$ and $E_2(t)$ are expressed as follows:

$$E_1(t)=S(t)\cdot\sin(\omega_0 t) \qquad (2)$$

$$E_2(t)=S(t)\cdot\sin((\omega_0+\Delta\omega)t) \qquad (3)$$

Here, S(t) represents the intensity of a laser beam, which is assumed to be constant with respect to time. The optical frequency of the first laser beam is represented by $\omega_0$, and $\omega_0/2\pi$ is approximately equal to 200 terahertz (THz), for example. The optical frequency difference (difference frequency) between the first laser beam and the second laser beam is represented by $\Delta\omega$.

These two types of the laser beams are transmitted from the transmitting-side telescope 1140 to the free space, and reaches the aperture plane of the receiving-side telescope 1210 through the atmospheric turbulence 21. In this case, the two types of the laser beams that have reached the aperture plane of the receiving-side telescope 1210 undergo different disturbances due to the atmospheric turbulence, and the time variations of the electric fields are respectively expressed by following E1'(t) and E2'(t).

$$E_1'(t)=S(t)\cdot A(t)\cdot\sin(\omega_0 t-\phi_A(t)) \qquad (4)$$

$$E_2'(t)=S(t)\cdot B(t)\cdot\sin((\omega_0+\Delta\omega)t-\phi_B(t)) \qquad (5)$$

Here, E1'(t) and E2'(t) expressed by formulae (4) and (5) represent time variations of the electric field intensities at one point on the aperture plane of the receiving-side telescope 1210. They can also be regarded approximately as electric field intensities of the entire laser beams illuminated onto the aperture plane of the receiving-side telescope 1210. The reason is that the diameter of the aperture plane can be regarded as sufficiently small compared with the spatial coherence radius of the laser beam because the receiving-side telescope 1210 is situated sufficiently away from the atmospheric turbulence 21. In formulae (4) and (5), A(t) represents the rate at which the laser beam with the first wavefront (WF #1) reaches the receiving-side telescope 1210, and likewise, B(t) represents the rate at which the laser beam with the second wavefront (WF #2) reaches the receiving-side telescope 1210.

FIG. 4A schematically illustrates the time variations in the intensities of E1'(t) and E2'(t) in this case. A fade occurs in each of two waves of the laser beams at the independent timing. If the wavelengths of these two waves are sufficiently far away from each other, and incoherent addition can be performed, the fade is mitigated due to the statistic multiplexing effect as indicated by the dotted line in FIG. 4A; accordingly, it can be expected that it becomes possible to receive a stable laser beam.

Next, a case will be considered where the difference frequency is equal to zero ($\Delta\omega=0$). In this case, the electric field $E_S(t)$ of the laser beam to be inputted into the receiving-side telescope 1210 can be expressed as follows:

$$E_S(t)=E_1'(t)+E_2'(t)=S(t)\cdot A(t)\cdot\sin(\omega_0 t-\phi_A(t))+S(t)\cdot B(t)\cdot\sin(\omega_0 t-\phi_B(t)) \qquad (6)$$

Regarding S(t) as constant, and rewriting the formula by omitting notation of the time t, it becomes the following formula. Here, it is assumed that S(t)=1.

$$E_S(t) = A\cdot\sin(\omega_0 t - \phi_A) + B\cdot\sin(\omega_0 t - \phi_B) \qquad (7)$$

$$\sin\omega_0 t\cdot(A\cos\phi_A + B\cos\phi_B) - \cos\omega_0 t\cdot$$

$$(A\sin\phi_A + B\sin\phi_B)$$

Here, $\omega_0$ represents the optical frequency of the laser beam.

The amplitude of an interference signal S on the photoelectric conversion surface of the optical receiver 1230 is expressed as follows:

$$S = A(\cos\phi_A - \sin\phi_A) + B(\cos\phi_B - \sin\phi_B) \qquad (8)$$

$$= -\sqrt{2}A\sin\left(\phi_A - \frac{\pi}{4}\right) - \sqrt{2}B\sin\left(\phi_B - \frac{\pi}{4}\right)$$

The intensity of the interference signal S varies randomly in the range of $\sqrt{2}\cdot(\pm A\pm B)$ because each of A, B, $\phi_A$, and $\phi_B$ included in formula (8) varies randomly in the time axis direction.

FIG. 4B schematically illustrates time variations of E1'(t) and E2'(t) in this case. Due to the atmospheric turbulence 21, E1'(t) and E2'(t) independently undergo random phase modulations simultaneously with random intensity modulations A(t) and B(t), respectively. As a result, the intensity of a sum of the electric fields of these two types of laser beams, E1'(t)+E2'(t), varies randomly as indicated by the solid line in FIG. 4B depending on phase conditions of E1'(t) and E2'(t). This makes it difficult to receive laser beams stably.

Next, a case will be described where the difference frequency is not equal to zero ($\Delta\omega \neq 0$). FIG. 4C schematically illustrates time variations of E1'(t) and E2'(t) in this case. The sum $E_S(t)$ of the electric fields of these two types of laser beams can be expressed as follows:

$$E_S(t)=E_1'(t)+E_2'(t)=S(t)\cdot A(t)\cdot \sin(\omega_0 t-\phi_A)+S(t)\cdot B(t)\cdot \sin((\omega_0+\Delta\omega)t-\phi_B) \quad (9)$$

As is the case with formula (7), regarding S(t) as constant, and omitting its notation, it becomes the following formula.

$$E_S(t) = A\cdot\sin(\omega_0 t - \phi_A) + B\cdot\sin((\omega_0 + \Delta\omega)t - \phi_B) \quad (10)$$

$$(A\cos\phi_A + B\cdot\cos(\Delta\omega t - \phi_B))\cdot\sin\omega_0 t -$$

$$(A\sin\phi_A - B\cdot\sin(\Delta\omega t - \phi_B))\cdot\cos\omega_0 t$$

The amplitude of the interference signal S on the photoelectric conversion surface of the optical receiver 1230 is expressed as follows:

$$S = -\sqrt{2}A\,\sin\left(\phi_A - \frac{\pi}{4}\right) - \sqrt{2}B\,\cdot\sin\left(\phi_B - \frac{\pi}{4} - \Delta\omega t\right) \quad (11)$$

Here, it is assumed that the difference frequency $\Delta\omega$ is sufficiently higher than the frequency component of atmospheric turbulence. Consequently, A, B, $\phi_A$, and $\phi_B$ can be regarded as constants in the range of a time sufficiently short as compared with atmospheric turbulence. Therefore, the interference signal S varies with a period of $\Delta\omega$ as expressed below.

$$S = A' + B'\sin\Delta\omega t \quad (12)$$

In this case, because the intensity variation due to the interference varies at a frequency $\Delta\omega$ that is sufficiently higher than atmospheric turbulence, it is possible to extract only a frequency component of atmospheric turbulence by removing a component $\Delta\omega$ from the interference signal S in the electrical filter circuit 1240. This makes it possible to obtain stably a signal intensity corresponding to the sum of E1'(t) and E2'(t).

Next, the calculation results of the electric field intensity of the beacon beam 22 will be described, where the beacon beam 22 is inputted into the receiving-side telescope 1210 in the free space optical communication system 1000 according to the present example embodiment. Here, data values of the above-mentioned A, B, $\phi$A, and $\phi$B are used that are obtained by numerical simulation relating to atmospheric propagation.

Figure 5:
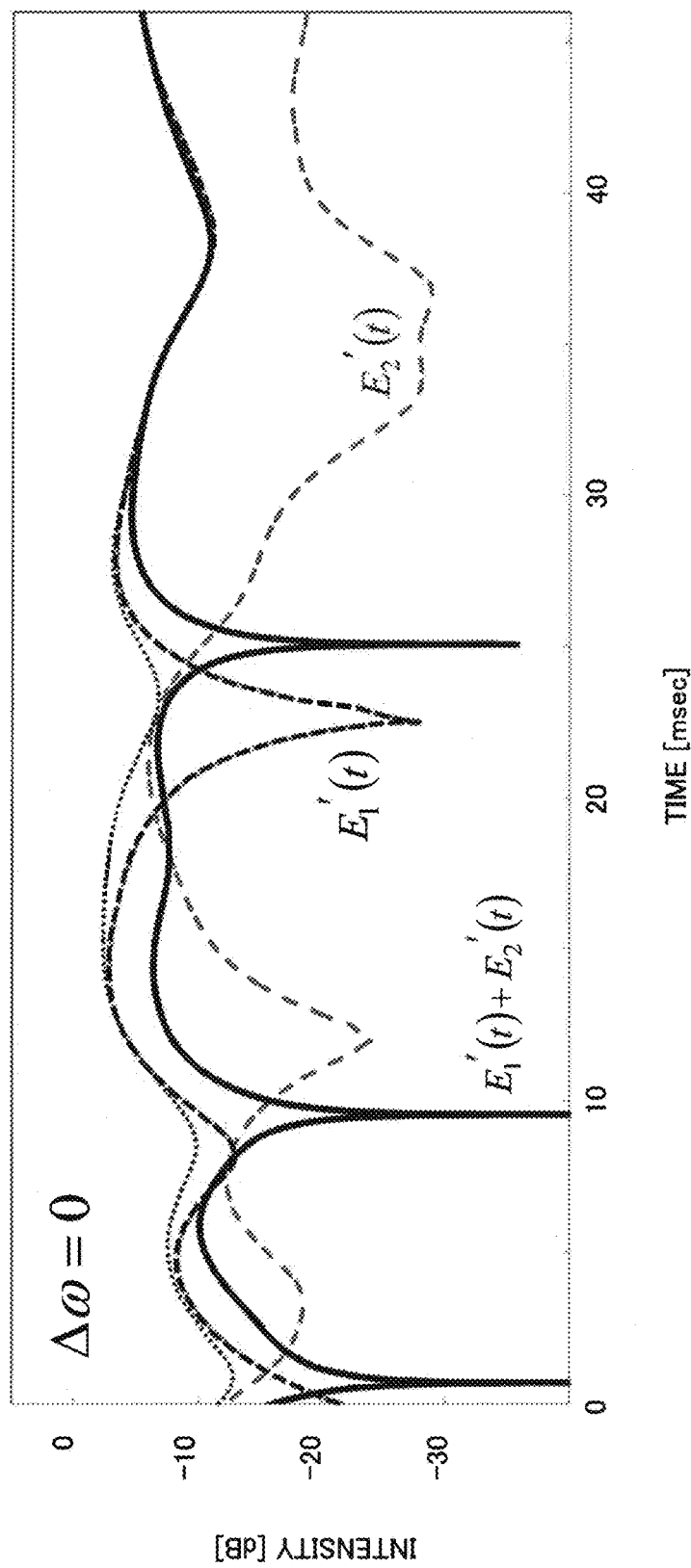
FIG. 5 is a diagram illustrating calculation results of electric field intensities of a beacon beam inputted into a receiving-side telescope when a difference frequency is set at zero in the free space optical communication system according to the second example embodiment of the present invention.

FIG. 5 illustrates calculation results of the electric field intensity of the beacon beam 22 to be inputted into the receiving-side telescope 1210 if the difference frequency is equal to zero ($\Delta\omega=0$). In FIG. 5, broken lines respectively represent electric field intensities E1'(t) and E2'(t) of two types of laser beams that are transmitted with different modes from each other. The solid line represents a variation in received light intensity of S=E1'(t)+E2'(t) that is a superposition of these electric field intensities.

It can be seen from FIG. 5, that E1'(t) and E2'(t) fade at mutually random timings. In contrast, the received light intensity S cannot be obtained by simple addition, and fades newly occur at a different timing from those of E1'(t) and E2'(t). A time width of these fades can be regarded as equivalent to that of the fade occurring in E1'(t) and E2'(t). The reason is that the fade-generating mechanism in the received light intensity S is fundamentally the same as the fade-generating mechanism in the fade that occurs in the beacon beam as a source.

It can be seen from the above that it is impossible to transmit a stable beacon beam if two types of laser beams are used in the condition that the difference frequency is equal to zero ($\Delta\omega=0$).

Figure 6:
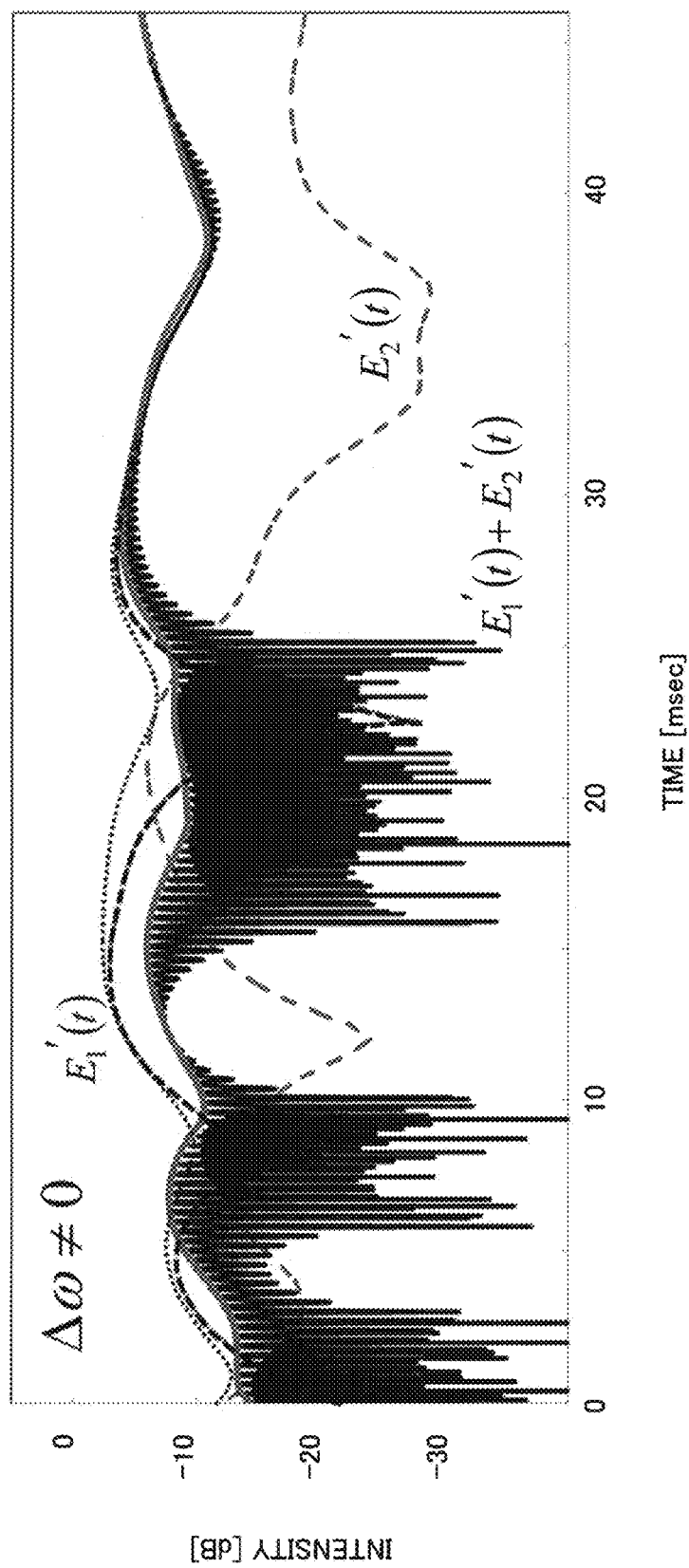
FIG. 6 is a diagram illustrating calculation results of electric field intensities of a beacon beam inputted into the receiving-side telescope when a difference frequency is not zero in the free space optical communication system according to the second example embodiment of the present invention.

FIG. 6 illustrates electric field intensities of a laser beam to be inputted into the receiving-side telescope 1210 if the difference frequency is not equal to zero ($\Delta\omega \neq 0$). The solid line represents a time variation of the intensity of a received optical signal S=E1'(t)+E2'(t) in which two types of laser beams having electric field intensities of E1'(t) and E2'(t) are superimposed. Although the received optical signal S repeats fades at a high frequency $\Delta\omega$, a deep fade does not occur in the envelope curve indicated by the solid line. This shows that it makes a stable beacon beam transmission feasible to use the beacon beam transmission method according to the present example embodiment.

As described above, according to the free space optical communication system 1000 of the present example embodiment, it is possible to transmit a beacon beam stably at low cost and maintain stable tracking.

[Third Example Embodiment]

Figure 7:
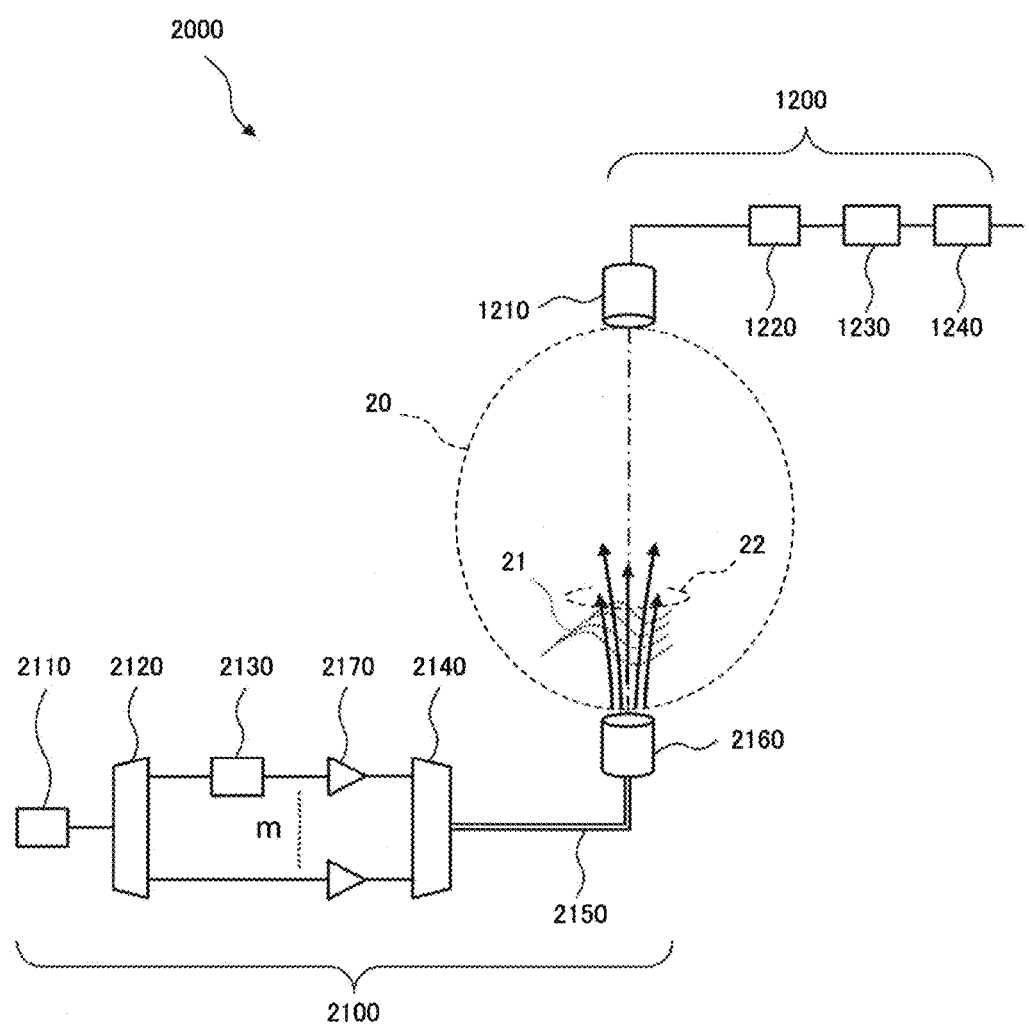
FIG. 7 is a block diagram illustrating a configuration of a free space optical communication system according to a third example embodiment of the present invention.

Next, a third example embodiment of the present invention will be described. FIG. 7 illustrates a configuration of a free space optical communication system 2000 according to the third example embodiment of the present invention. The free space optical communication system 2000 includes a free space optical transmitter 2100 and a free space optical receiver 1200, and transmits a beacon beam through a free space 20. The free space optical receiver 1200 is the same as that in the second example embodiment.

The free space optical transmitter 2100 includes a single laser light source 2110, an optical splitter 2120 serving as an optical splitting means, and an optical frequency shifter 2130 serving as an optical frequency shifting means, which constitute a laser beam transmitting means. The free space optical transmitter 2100 further includes a mode multiplexer 2140 and a few mode fiber (FMF) 2150 serving as a mode combining means, and a transmitting-side telescope 2160 serving as an emitting means, which constitute a wavefront control beam transmitting means.

The optical frequency shifter 2130 and the mode multiplexer 2140 can be connected by a single mode fiber (SMF). It may be configured to include an optical amplifier 2170 to amplify an inputted laser beam in this section.

The single laser light source 2110 transmits a single laser beam having a single wavelength. The optical splitter 2120 splits the single laser beam and generates a plurality of (m pieces) split laser beams.

The optical frequency shifter 2130 shifts each of the optical frequencies of the plurality of split laser beams by a different frequency. For example, the optical frequency shifter 2130 shifts the optical frequency of the inputted split laser beam by a predetermined optical frequency $\Delta\omega/2\pi$. As the optical frequency shifter 2130, an AO frequency shifter based on the acousto-optic (AO) effect can be used, for example.

The mode multiplexer 2140 and the few mode fiber (FMF) 2150 serving as a multi-mode waveguide means make it possible to generate a synthetic laser beam obtained by converting a plurality of laser beams into different modes orthogonal to each other respectively and combining them. Specifically, the mode multiplexer 2140 multiplexes laser beams inputted from m pieces of single mode fibers into spatial orthogonal modes and outputs the multiplexed modes to one few mode fiber (FMF) 2150. The few mode fiber (FMF) 2150 is capable of transmitting with low loss the m pieces of laser beams multiplexed with orthogonal modes. As the mode multiplexer 2140, a spatial mode multiplexing element based on multifaceted light conversion can be used, for example.

The transmitting-side telescope 2160 emits the synthetic laser beam as a beacon beam 22 to the free space 20.

Next, the operation of the frequency shifter 2130 will be described using FIG. 8A and FIG. 8B.

Figure 8A:
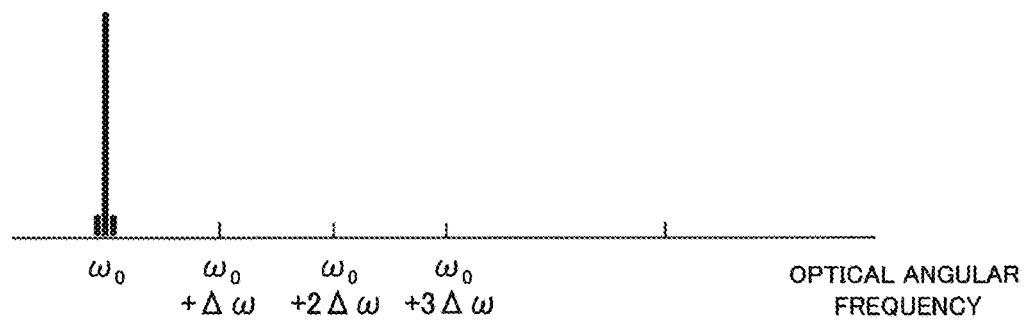
FIG. 8A is a schematic diagram to describe the operation of a frequency shifter included in the free space optical transmitter according to the third example embodiment of the present invention.

As illustrated in FIG. 8A, the laser beam output from the single laser light source 2110 oscillates at a single optical angular frequency $\omega_0$. The optical splitter 2120 splits the single laser beam into m pieces of laser beams. The frequency shifter 2130 does not perform a frequency shift on one of the split laser beams having been split, but performs a frequency shift of angular frequency differences $\Delta\omega$, $2\Delta\omega$, $3\Delta\omega$, . . . , and $(m-1)\Delta\omega$ on the remaining (m−1) split laser beams (see FIG. 8B).

The optical amplifier 2170 amplifies each of the m frequency-shifted split laser beams to obtain the light intensity necessary for propagating through the free space 20. The mode multiplexer 2140 converts the m pieces of amplified laser beams into orthogonal eigenmodes of the few mode fibers (FMF) 2150, and multiplexes them. The transmitting-side telescope 2160 transmits the multiplexed laser beams to the free space 20. The laser beams transmitted from the transmitting-side telescope 2160 propagate through the free space 20 as light beams 22-1 to 22-$m$ having mutually different wavefronts corresponding to the eigenmodes of the few mode fiber (FMF) 2150.

Figure 8B:
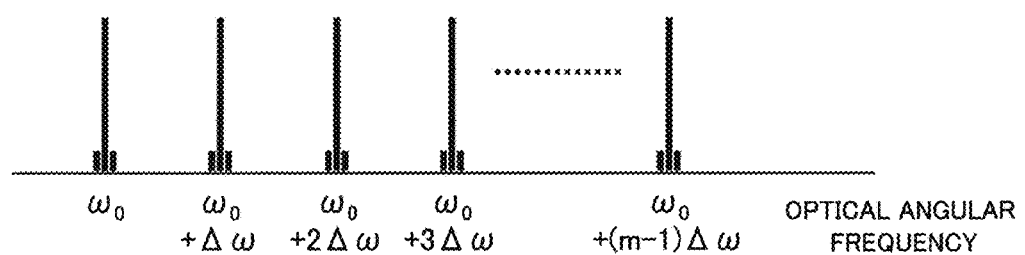
FIG. 8B is a schematic diagram to describe the operation of the frequency shifter included in the free space optical transmitter according to the third example embodiment of the present invention.

FIG. 8A and FIG. 8B illustrate the configurations in which laser beams are arranged at regular intervals by the angular frequency difference $\Delta\omega$; however, not limited to this, it may be configured such that laser beams are arranged with an angular frequency difference of an irregular interval.

Figure 9:
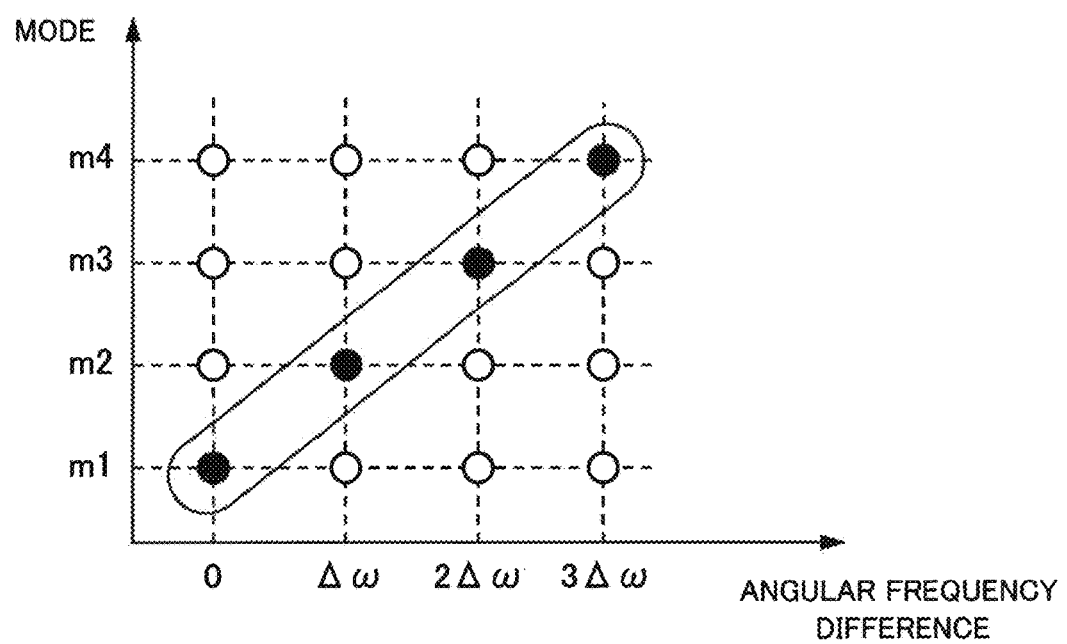
FIG. 9 is a schematic diagram to describe a correspondence relation between an angular frequency of a laser beam and an eigenmode of a few mode fiber (FMF) in the free space optical transmitter according to the third example embodiment of the present invention.

FIG. 9 schematically illustrates a correspondence relation between an angular frequency of a laser beam to be multiplexed in the mode multiplexer 2140 constituting the mode combining means and an eigenmode of the few mode fiber (FMF) 2150. The horizontal axis in FIG. 9 denotes an angular frequency difference from an angular frequency of a laser beam as a reference, and the vertical axis denotes a mode number that conceptually expresses an eigenmode of the few mode fiber (FMF) 2150. Specifically, the mode number can be made to correspond to a linearly polarized (LP) mode.

The mode multiplexer 2140 converts a laser beam with one optical frequency into only one mode different from a mode of a laser beam with the other optical frequency. Specifically, the laser beams are multiplexed into the few mode fiber (FMF) 2150 with the combination indicated by solid black circles illustrated in FIG. 9, and arranged so that an optical frequency may not overlap with an eigenmode.

In the above-mentioned description, the free space optical transmitter 2100 includes the frequency shifter 2130; however, a phase modulator (phase modulating means) may be used in place of the frequency shifter 2130. Specifically, the free space optical transmitter 2100 can be configured to include a laser light source to transmit a single laser beam, an optical splitter (optical splitting means), and a phase modulator (phase modulating means), which serve as a laser beam transmitting means. Here, the optical splitter splits a single laser beam and generates a plurality of split laser beams. The phase modulator performs phase modulation on the plurality of split laser beams at different frequencies from each other.

The phase modulator (phase modulating means) can be configured to perform phase modulation in the range not less than a phase amount corresponding to one wavelength of the split laser beam at a frequency larger than a frequency of atmospheric turbulence in the free space. This configuration makes it possible to vary an interference state of the laser beam. Specifically, a phase of the second laser beam is phase-modulated at one megahertz (MHz) in the range of $\pm\pi$ (=0 to $2\pi$) to the first laser beam, and a phase of the third laser beam is phase-modulated at two megahertz (MHz) in the range of $\pm\pi$ (=0 to $2\pi$) to the first laser beam, for example. It is only necessary to obtain a sufficient resolution in the range of $2\pi$ with regard to the phase modulation, and a step-like (discontinuous) phase modulation or a continuous phase modulation may be used.

This makes it possible to obtain the same advantageous effects as is the case in using the above-mentioned frequency shifter 2130. In this case, the mode multiplexer 2140 (mode combining means) can be configured to convert a laser beam with one optical frequency into only one mode different from a mode of a laser beam having a different frequency of the variation in phase difference.

Next, the operation of the free space optical receiver 1200 included in the free space optical communication system 2000 according to the present example embodiment will be described.

M pieces of laser beams transmitted from the free space optical transmitter 2100 reach an aperture plane of the receiving-side telescope 1210 after having been affected by atmospheric turbulence 21 in the free space 20. The m pieces of laser beams are collected by the receiving-side telescope 1210, from which background light is removed by the narrowband band-pass filter (BPF) 1220, and then photoelectric conversion is performed on the m pieces of laser beams by the optical receiver 1230.

Figure 8C:
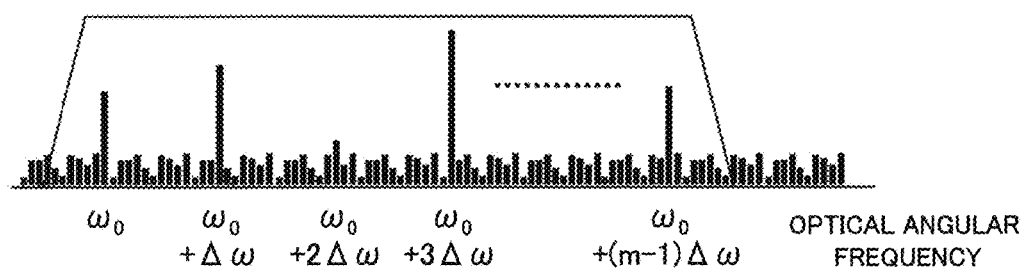
FIG. 8C is a schematic diagram to describe the operation of a narrowband band-pass filter (BPF) included in a free space optical receiver according to the third example embodiment of the present invention.

FIG. 8C schematically illustrates transmission characteristics of the narrowband band-pass filter (BPF) 1220. In FIG. 8C, a plurality of vertical lines represent an optical spectral distribution, and a trapezoidal-shaped solid line represents a transmission band of the narrowband band-pass filter (BPF) 1220. In the optical spectrum, broadband background light is superimposed as a noise on the m pieces of laser beams. A variation occurs in the light intensities of the laser beams due to the atmospheric turbulence 21.

The transmission band of the narrowband band-pass filter (BPF) 1220 is set so as to transmit the spectra of m pieces of laser beams and remove a noise caused by background light other than the band of the laser beams. For example, the frequency difference between a plurality of laser beams is set at 10 megahertz ($\Delta\omega/2\pi=10$ MHz), and the number m of laser beams is set at six (m=6). In this case, it is desirable for a half bandwidth of the transmission band of the narrowband band-pass filter (BPF) 1220 to be equal to or larger than $2\times m\times\Delta\omega/2\pi=120$ megahertz (MHz).

As described in the above-mentioned background art, it is necessary, in order to deal with the Doppler shift, to use an optical band-pass filter (BPF) having a passing bandwidth of about 18 GHz. Because the bandwidth of the laser beam obtained above (120 MHz) is sufficiently small as compared with the passing bandwidth, it is also possible to deal with the Doppler shift.

M pieces of laser beams transmitted from the free space optical transmitter 2100 undergo photoelectric conversion all at once in the optical receiver 1230 with time variation characteristics of the light intensity and the phase different from each other due to the atmospheric turbulence 21. At this time, interferences occur between the m pieces of laser beams, and in this case, m(m−1)/2 different combinations are available. The frequency component of the interference signal is sin (kΔωt) (k=1, 2, . . . , and m−1) from the second term of formula (11).

Consequently, even though m pieces of laser beams are used, it is only necessary to set the difference frequency Δω at a value sufficiently higher than the frequency component of the atmospheric turbulence as is the case with using two types of laser beams described with reference to FIG. 6. This makes it possible to remove a Δω component from the interference signal in the electrical filter circuit 1240 and extract the frequency component of the atmospheric turbulence only.

Figure 10:
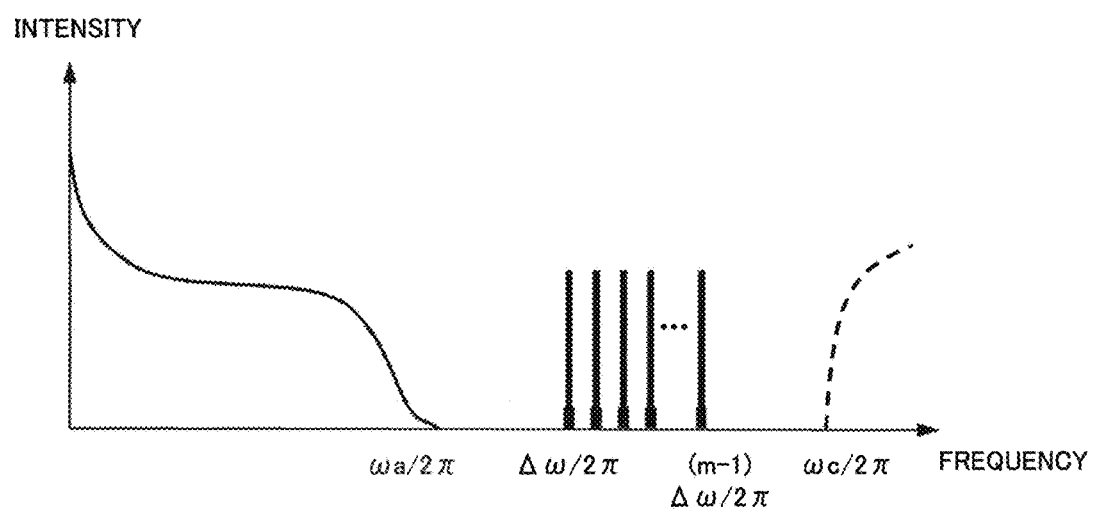
FIG. 10 is a diagram schematically illustrating a relationship between a frequency component of atmospheric turbulence and a frequency difference component added by the frequency shifter included in the free space optical transmitter according to the third example embodiment of the present invention.

FIG. 10 schematically illustrates the relationship between a frequency difference component added by the frequency shifter 2130 and a frequency component of the atmospheric turbulence. The horizontal axis denotes a frequency, and the vertical axis denotes the intensity of each signal.

A frequency offset width of each laser beam is arranged in the range from Δω/2π to (m−1)Δω/2π. In order to perform a stable tracking avoiding the influence of the atmospheric turbulence, it is necessary for Δω/2π of the minimum value of a difference frequency to be sufficiently higher than ωa/2π of the upper limit of a frequency component that the atmospheric turbulence in the free space has. The reason is that it is necessary for an amplitude variation due to the interference by at least one or more period in the time range when the atmospheric turbulence can be regarded as sufficiently stationary.

Specifically, because the frequency component of the atmospheric turbulence is about one to two kilohertz (kHz), Δω/2π can be equal to 10 megahertz (MHz), for example. Consequently, about 5,000 intensity variations due to the interference occurs between two types of laser beams during the period when the state of the atmospheric turbulence can be regarded as constant.

Next, a free space optical communication method according to the present example embodiment will be described.

In the free space optical communication method according to the present example embodiment, first of all, in a first communication station, a plurality of laser beams capable of interfering with each other and differing in one of an optical frequency and a time variation of a phase difference are generated. Then a plurality of wavefront control beams obtained by making each of the plurality of laser beams have a different wavefront are transmitted to a free space.

Subsequently, in a second communication station configured to communicate with the first communication station, received light including received laser beams of wavefront control beams having propagated through the free space is collected. Then the received laser beams are extracted from the received light, and the received laser beams undergo photoelectric conversion.

Here, a laser beam composed of a plurality of wavefront control beams can be used as a beacon beam in the free space optical communication.

As described above, according to the free space optical communication system 2000 and the free space optical communication method of the present example embodiment, it is possible to transmit a beacon beam stably at low cost and maintain stable tracking. That is to say, it becomes possible to avoid the influence of the atmospheric turbulence and transmit the beacon beam stably from the ground to an artificial satellite.

The free space optical communication system 2000 according to the present example embodiment can be applied to a transmission of an uplink beacon beam in free space optical communication between the ground and an artificial satellite. This makes it possible to solve the problem that a beacon beam fades due to atmospheric turbulence, and the accuracy is degraded with which an artificial satellite tracks a ground station. As a result, it becomes possible to provide a stable free space optical communication system by stable tracking control.

[Fourth Example Embodiment]

Figure 11:
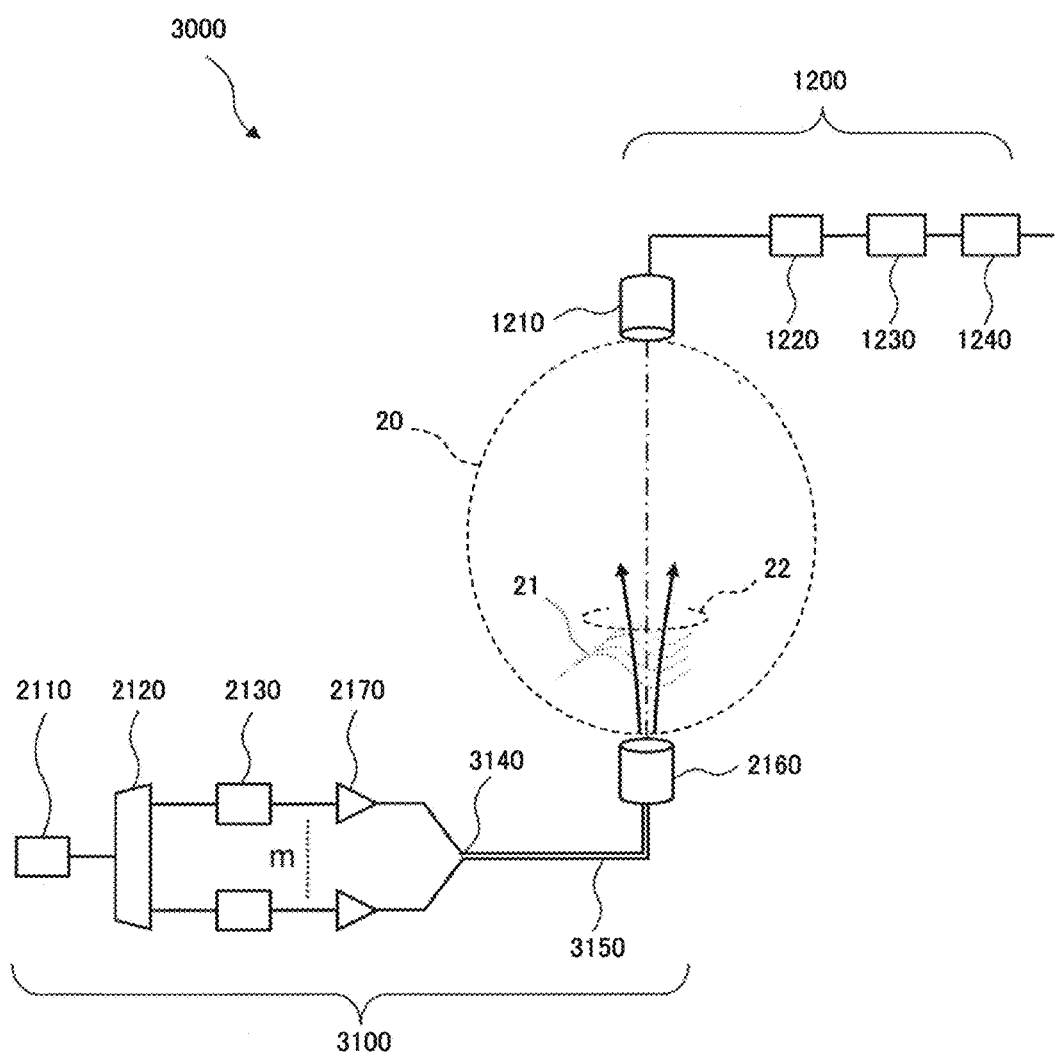
FIG. 11 is a block diagram illustrating a configuration of a free space optical communication system according to a fourth example embodiment of the present invention.

Next, a fourth example embodiment of the present invention will be described. FIG. 11 illustrates a configuration of a free space optical communication system 3000 according to the fourth example embodiment of the present invention. The free space optical communication system 3000 includes a free space optical transmitter 3100 and a free space optical receiver 1200, and transmits a beacon beam through a free space 20. The free space optical receiver 1200 is the same as that in the second example embodiment.

The free space optical transmitter 3100 differs in the configuration of the wavefront control beam transmitting means from the free space optical transmitter 2100 according to the third example embodiment. Specifically, the free space optical transmitter 3100 according to the present example embodiment has a wavefront control beam transmitting means including a plurality of optical waveguide means for guiding a plurality of laser beams respectively with a single optical mode, and an emitting means for emitting, to the free space, a plurality of laser beams propagating through the plurality of optical waveguide means.

Specifically, the free space optical transmitter 3100 according to the present example embodiment can be configured to include a bundle fiber 3150 and a fanout unit 3140 in place of the mode multiplexer 2140 and the few mode fiber (FMF) 2150. Here, the bundle fiber 3150 is composed of m pieces of single mode fibers (SMFs). The fanout unit 3140 splits a bundle fiber into individual single mode fibers (SMFs).

M pieces of laser beams are transmitted from the transmitting-side telescope 2160 to the free space 20 through the m pieces of single mode fibers (SMFs) included in the bundle fiber 3150. Because spatial relative positions of single mode fibers (SMFs) differs within the transmitting-side telescope 2160, the m pieces of laser beams are transmitted to the free space 20 with each of the m pieces of laser beams having a different wavefront.

A beacon beam 22 composed of the plurality of laser beams having different wavefronts transmitted from the free space optical transmitter 3100 is received by the free space optical receiver 1200 after having propagated through the free space 20 as is the case with the free space optical communication system 2000 according to the third example embodiment.

According to the free space optical communication system 3000 of the present example embodiment, it is possible to transmit a beacon beam stably at low cost and maintain stable tracking.

The free space optical communication system 3000 according to the present example embodiment can be applied to a transmission of an uplink beacon beam in free space optical communication between the ground and an artificial satellite. This makes it possible to solve the problem that a beacon beam fades due to atmospheric turbulence, and the accuracy is degraded with which an artificial satellite tracks a ground station. As a result, it becomes possible to provide a stable free space optical communication system by stable tracking control.

[Fifth Example Embodiment]

Figure 12:
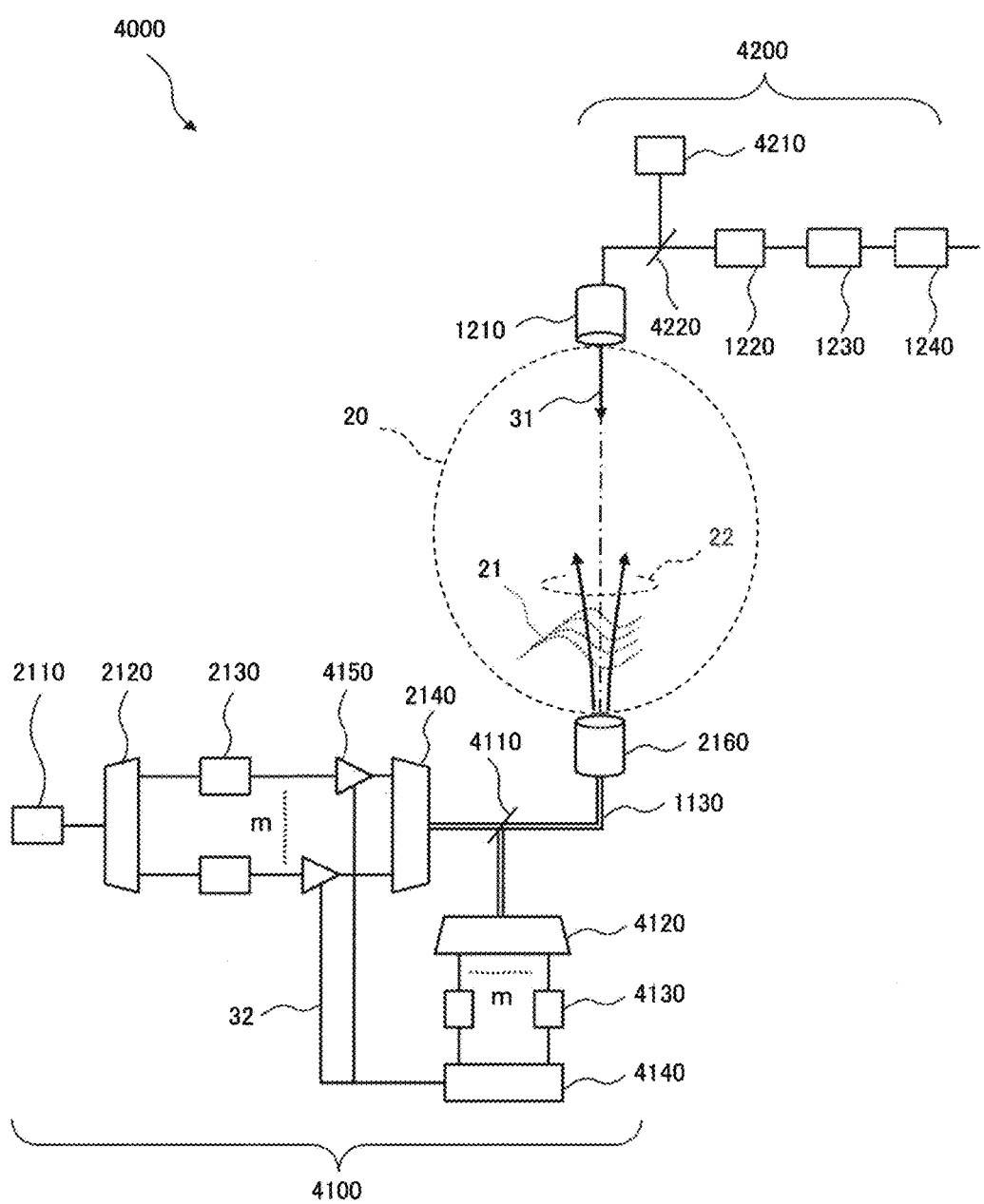
FIG. 12 is a block diagram illustrating a configuration of a free space optical communication system according to a fifth example embodiment of the present invention.

Next, a fifth example embodiment of the present invention will be described. FIG. 12 is a block diagram illustrating a configuration of a free space optical communication system 4000 according to the fifth example embodiment of the present invention. The free space optical communication system 4000 includes a free space optical transmitter 4100 and a free space optical receiver 4200, and transmits a beacon beam 22 through a free space 20.

The free space optical communication system 4000 according to the present example embodiment has a configuration in which a new function is added to the above-mentioned free space optical communication system 2000 according to the third example embodiment.

The free space optical transmitter 4100 includes a single laser light source 2110, an optical splitter 2120, an optical frequency shifter 2130, a mode multiplexer 2140, an optical waveguide medium 1130, and a transmitting-side telescope 2160. The configuration described above is the same as that of the free space optical transmitter 2100 according to the third example embodiment.

The free space optical transmitter 4100 further includes a transmitting-side optical splitter 4110, a mode separator 4120 serving as a mode separating means, a monitoring optical receiver 4130 serving as a monitoring optical receiving means, a controller 4140 serving as a control means, and a variable optical amplifier 4150 serving as a light intensity adjusting means.

The free space optical receiver 4200 includes a receiving-side telescope 1210, a narrowband band-pass filter (BPF) 1220, an optical receiver 1230, and an electrical filter circuit 1240. The configuration described above is the same as that of the free space optical receiver 1200 according to the second example embodiment.

The free space optical receiver 4200 further includes a receiving-side laser light source 4210 configured to transmit a monitoring laser beam and a receiving-side optical splitter 4220. Here, the receiving-side optical splitter 4220 and the receiving-side telescope 1210 constitute a receiving-side emitting means, which emits a monitoring laser beam 31 to the free space 20. The receiving-side optical splitter 4220 has the function of splitting and merging a laser beam traveling from the receiving-side telescope 1210 to the narrowband band-pass filter (BPF) 1220 and a monitoring laser beam traveling from the receiving-side laser light source 4210 to the receiving-side telescope 1210. As the receiving-side optical splitter 4220, a device can be used that is similar to the transmitting-side optical splitter 4110 included in the free space optical transmitter 4100.

In contrast, the transmitting-side optical splitter 4110 has the function of splitting and merging a laser beam traveling from the mode multiplexer 2140 to the transmitting-side telescope 2160, which corresponds to the beacon beam 22 propagating through the free space 20, and a monitoring laser beam collected by the transmitting-side telescope 2160. The transmitting-side optical splitter 4110 and the transmitting-side telescope 2160 constitute a transmitting-side light collecting means, which collects a received monitoring laser beam of a monitoring laser beam after having propagated through the free space 20.

As the transmitting-side optical splitter 4110, a wavelength separation filter, a circulator, a polarization separation element, and the like can be used. The transmitting-side optical splitter 4110 is inserted in the track of the optical waveguide medium 1130. Specifically, the transmitting-side optical splitter 4110 can be inserted in the track of a few mode fiber (FMF) constituting the optical waveguide medium 1130, or in an optical system between the few mode fiber (FMF) and the transmitting-side telescope 2160. It is desirable to use the optical waveguide medium 1130 in which less crosstalk occurs between propagating laser beams with a plurality of orthogonal modes.

The mode separator 4120 separates the received monitoring laser beam into different modes orthogonal to each other, and generates a plurality of monitoring mode beams. Specifically, the mode separator 4120 separates the received monitoring laser beam, which is collected by the transmitting-side telescope 2160 and inputted through the optical waveguide medium 1130, into m pieces of orthogonal propagation modes, and couples the m pieces of propagation modes to m pieces of single mode fibers (SMFs) respectively.

The monitoring optical receiver 4130 performs photoelectric conversion on each of a plurality of (m pieces of) mode-separated monitoring mode beams, and generates a monitoring signal. The controller 4140 controls the variable optical amplifier 4150 based on the monitoring signal. Specifically, the controller 4140 monitors the intensities of m pieces of laser beams received by the monitoring optical receiver 4130, and generates a control signal 32 following a predetermined procedure. The variable optical amplifier 4150 varies each intensity of a plurality of laser beams transmitted from the optical frequency shifter 2130 based on the control signal 32.

Next, the operation of the free space optical communication system 4000 according to the present example embodiment will be described.

In the free space optical communication system 4000 according to the present example embodiment, it is possible to stabilize the propagation characteristics of the beacon beam 22 of a laser beam propagating in an uplink direction by using the monitoring laser beam 31 propagating in a downlink direction.

The monitoring laser beam 31 and the beacon beam 22 share the free space 20, and simultaneously propagate in both directions. The propagation of a laser beam through the atmospheric turbulence 21 can be approximately regarded as reversible. In addition, the atmosphere can be regarded as stationary with respect to the propagation of the laser beam because a time during which a laser beam propagates through the atmosphere is sufficiently short as compared with a time constant of the atmospheric turbulence 21. Specifically, assuming that the thickness of the atmosphere (troposphere and stratosphere) is equal to 50 kilometers (km), a time during which a laser beam propagates through the atmosphere is about 0.17 millisecond (msec) if the zenith angle is 0 degree. Consequently, assuming that a frequency component of the atmospheric turbulence is equal to one kilohertz (kHz), that is, a time constant is equal to one millisecond (msec), it can be seen that a propagation time of the laser beam is sufficiently small as compared with the time constant of the atmospheric turbulence 21.

The wavefront of the monitoring laser beam 31 in the downlink is disturbed due to the influence of the atmospheric turbulence. The received monitoring laser beam of monitoring laser beams after having propagated through the free space 20 is collected by the transmitting-side telescope 2160, and introduced to the mode separator 4120 through the optical waveguide medium 1130 and the transmitting-side optical splitter 4110. The mode separator 4120 separates the received monitoring laser beam into orthogonal modes, and the monitoring optical receiver 4130 measures each intensity of the modes. This makes it possible to detect propagation characteristics of the free space 20 including the atmospheric turbulence 21. Specifically, a plurality of mode-separated monitoring mode beams are photoelectrically converted in by the monitoring optical receiver 4130, and each intensity is obtained, which makes it possible to obtain an intensity distribution coefficient to an m-th mode of the monitoring laser beam 31.

Assuming that propagation characteristics of the free space 20 are reversible, the intensity distribution coefficients detected here can be regarded as equal to propagation coefficients of the laser beams 22-1 to 22-$m$ with m modes constituting the beacon beam 22 in the uplink. That is to say, it becomes possible to estimate coefficients corresponding to A' and B' in formula (12) from a light intensity monitoring value of the monitoring optical receiver 4130.

The controller 4140 generates m pieces of control signals 32 to control the intensities of the laser beams to be transmitted following a predetermined procedure, based on the light intensity monitoring value of the monitoring optical receiver 4130.

As described above, the output light intensities of m pieces of laser beams transmitted from the optical frequency shifter 2130 are adjusted by the variable optical amplifier 4150. After that, the m pieces of laser beams are multiplexed in the mode multiplexer 2140, and the multiplexed laser beams are transmitted to the free space 20 as the beacon beam 22 from the transmitting-side telescope 2160.

As an example of a control method by the controller 4140, it is possible to use a method of selecting laser beams with modes corresponding to top two values of the light intensity monitoring values obtained from the monitoring optical receiver 4130. Specifically, the controller 4140 selects top two modes in descending order of the light intensity from among inputted m pieces of light intensity monitoring values in the downlink, and transmits a control signal 32 to designate the two modes to the variable optical amplifier 4150. The variable optical amplifier 4150 sufficiently attenuates the output intensities of laser beams corresponding to (m−2) modes other than the designated two modes.

Here, it is assumed that the monitoring optical receiver 4130 cannot detect a phase of light. Accordingly, the phase difference in the laser beam reaching the receiving-side telescope 1210 cannot be controlled. Consequently, the phase of the laser beam constituting the beacon beam 22 randomly varies due to the atmospheric turbulence 20. In this case, when an uplink laser beam (beacon beam 22) is transmitted with not less than three modes, the condition of destructive interference stochastically arises because of there being a plurality of combinations. In contrast, it is possible to stabilize interference that occurs in the optical receiver 1230 included in the free space optical receiver 4200 by restricting the number of laser beams to be transmitted to two, as mentioned above.

Next, a free space optical communication method according to the present example embodiment will be described.

In the free space optical communication method of the present example embodiment, first, in a second communication station to communicate with a first communication station, a monitoring laser beam is generated, and the monitoring laser beam is emitted to a free space. Then in the first communication station, received monitoring laser beam is collected that is the monitoring laser beam after having propagated through the free space, the received monitoring laser beam is separated into different modes orthogonal to each other, which results in generating a plurality of monitoring mode beams. A monitoring signal is generated by respectively photoelectrically converting the plurality of monitoring mode beams, and the intensities of a plurality of laser beams are respectively varied based on the monitoring signal.

In this case, the first communication station may be configured to select two types of monitoring mode beams having a large intensity of the monitoring signal from among the plurality of monitoring mode beams. Then the intensities of laser beams other than two types of laser beams corresponding to two types of monitoring mode beams among the plurality of laser beams are attenuated. In addition, it can be configured to control each intensity of these two types of laser beams so that the time variation of the intensity of the received laser beam in the second communication station may become smaller.

As described above, according to the free space optical communication system 4000 and the free space optical communication method of the present example embodiment, it is possible to transmit a beacon beam stably at low cost and maintain stable tracking. In addition, it becomes possible to adjust the intensity ratio with respect to each mode of the uplink laser beam referring to propagation characteristics of the downlink laser beam; therefore, it is possible to stabilize the intensity of the beacon beam reaching the free space optical receiver 4200.

[Sixth Example Embodiment]

Figure 13:
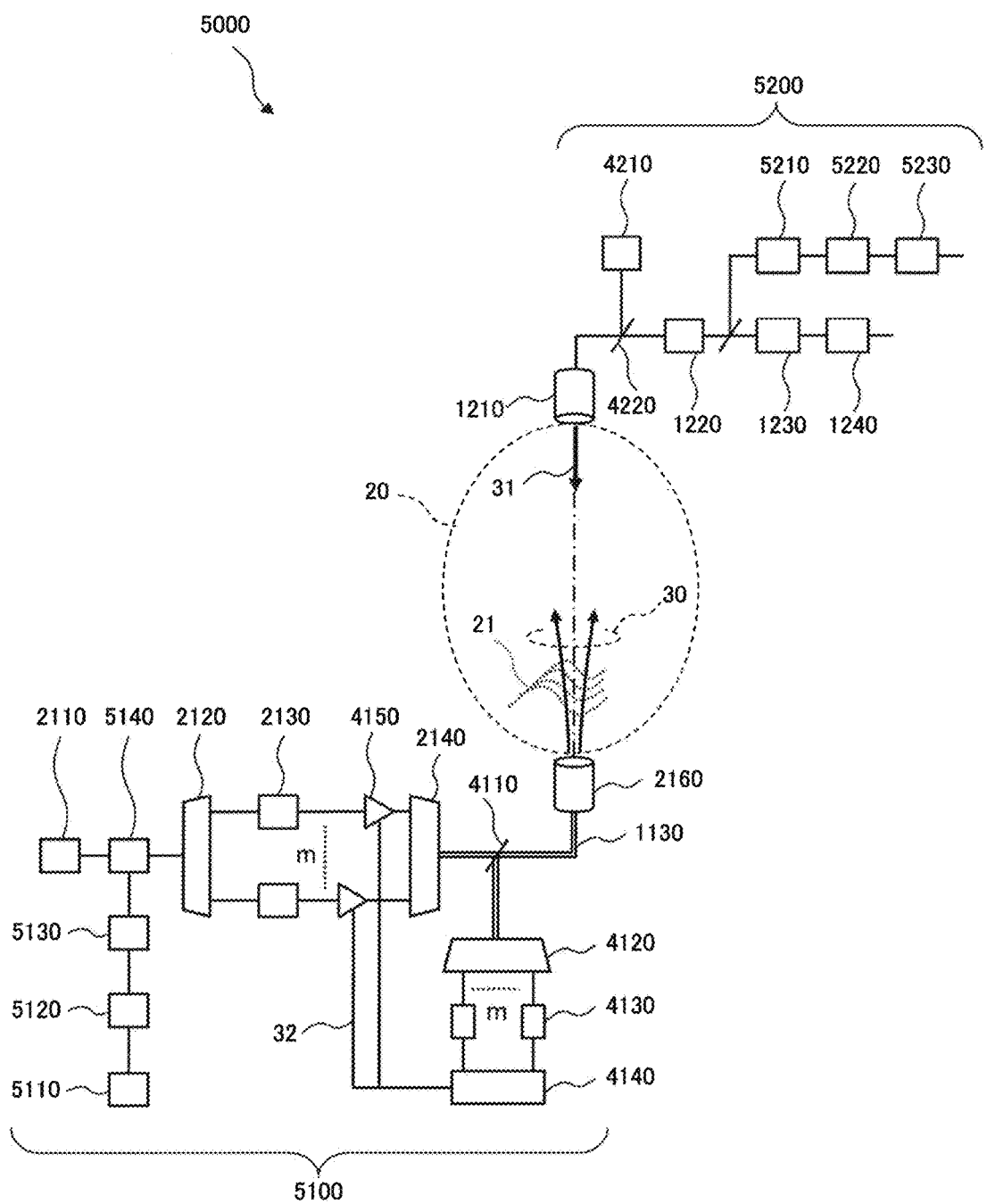
FIG. 13 is a block diagram illustrating a configuration of a free space optical communication system according to a sixth example embodiment of the present invention.

Next, a sixth example embodiment of the present invention will be described. FIG. 13 illustrates a configuration of a free space optical communication system 5000 according to the sixth example embodiment of the present invention. The free space optical communication system 5000 includes a free space optical transmitter 5100 and a free space optical receiver 5200, and transmits a signal laser beam 30 through a free space 20.

The free space optical communication system 5000 according to the present example embodiment has a configuration in which an uplink signal communication function is added to the configuration of the above-mentioned free space optical communication system 4000 according to the fifth example embodiment.

The free space optical transmitter 5100 further includes a signal source 5110, a signal multiplexer 5120, a transmitting-side high-pass filter (HPF) 5130 serving as a transmitting-side high-pass means, and an optical modulator 5140 serving as an optical modulating means. Here, the signal source 5110 and the signal multiplexer 5120 constitute an information signal generating means, which generates an information signal to be transmitted. Because the other configurations are the same as those of the free space optical transmitter 4100 according to the fifth example embodiment, their descriptions will not be repeated.

The free space optical receiver 5200 further includes a signal optical receiver 5210 serving as a receiving means, a receiving-side high-pass filter (HPF) 5220 serving as a receiving-side high-pass means, and a signal regenerator 5230 serving as an information signal regenerating means. Because the other configurations are the same as those of the free space optical receiver 4200 according to the fifth example embodiment, their descriptions will not be repeated.

The signal source 5110 included in the free space optical transmitter 5100 generates a signal sequence to be transmitted in an uplink. The signal multiplexer 5120 makes a signal sequence by multiplexing twice the signal sequence generated in the signal source 5110 in terms of a predetermined block length. The transmitting-side high-pass filter (HPF) 5130 cuts off a low frequency component included in a spectral component of the multiplexed signal, and makes only a high-frequency-side component pass. The optical modulator 5140 modulates a laser beam output from a single laser light source 2110 in accordance with the signal sequence.

The signal optical receiver 5210 included in the free space optical receiver 5200 receives the laser beam modulated in the free space optical transmitter 5100 and performs photoelectric conversion on the received laser beam. The receiving-side high-pass filter (HPF) 5220 cuts off a low frequency component from a spectrum of the photoelectrically converted signal, and makes only a high-frequency-side component pass. The signal regenerator 5230 regenerates a received signal from the signal having passed through the receiving-side high-pass filter (HPF) 5220.

Next, the operation of the free space optical communication system 5000 according to the present example embodiment will be described using FIG. 14. FIG. 14 is a diagram schematically illustrating signal sequences and signal spectra in the free space optical communication system 5000 of the present example embodiment.

As illustrated in the column A of FIG. 14, the signal source 5110 generates a signal sequence with a predetermined block size. The column A illustrates a case where an offset frequency added by an optical frequency shifter 2130 is set at $\Delta\omega/2\pi$, and a time of a block length is set at $2\pi/\Delta\omega$.

As illustrated in the column B of FIG. 14, the signal sequence is multiplexed by repeating it twice. As illustrated in the column B, the spectrum includes a low frequency component reflecting a long period component of the signal.

As illustrated in the column C of FIG. 14, the transmitting-side high-pass filter (HPF) 5130 removes the low frequency component from the spectrum of the signal. The rectangular broken line in the column C represents transmission characteristics of the transmitting-side high-pass filter (HPF) 5130. The cut-off frequency fc satisfies the relationship of $(m-1)\Delta\omega/2\pi < fc$. It is required to satisfy the relationship in order that the spectral component of the signal from the signal source 5110 may not affect a beat with a frequency $\Delta\omega$ arising on a receiving side due to an uplink signal laser beam to which a frequency offset is added.

The signal laser beam modulated by the optical modulator 5140 is transmitted from a transmitting-side telescope 2160 to the free space 20 after having been split into m pieces of laser beams and having been subjected to optical frequency offset processing.

The signal laser beam 30 transmitted from the free space optical transmitter 5100 reaches the free space optical receiver 5200 after having undergone atmospheric turbulence 21. The signal laser beam 30 interferes on an aperture plane of a receiving-side telescope 1210, and an intensity variation arises with a period of $\Delta\omega$. As illustrated in the column D of FIG. 14, the period of the intensity variation is equal to a period of a signal multiplexed twice.

The signal subjected to photoelectric conversion in the signal optical receiver 5210 has the potential of occurrence of a fade with a period of $\Delta\omega/2\pi$ as a result of the interference. However, in the present example embodiment, it is possible to secure signal redundancy because a transmission signal is transmitted twice over with the same period.

As the spectrum illustrated in the column E of FIG. 14, the signal subjected to photoelectric conversion by the signal optical receiver 5210 includes a frequency offset ($\Delta\omega/2\pi$) component. As the spectrum illustrated in the column F of FIG. 14, the frequency offset component is removed by the receiving-side high-pass filter (HPF) 5220. As illustrated in the column G of FIG. 14, the signal regenerator 5230 selects a block without including a fading part, and regenerates a received signal.

The above-mentioned fade that occurs in the signal subjected to photoelectric conversion by the signal optical receiver 5210 arises with a period of $\Delta\omega/2\pi$ if A=B, and $\phi A = \phi B$ in formula (11). Here, $\phi A$ and $\phi B$ are unknown variables, and the coefficients A and B are determined by the signal optical receiver 5210.

The controller 4140 included in the free space optical transmitter 5100 is capable of adjusting output light intensity by controlling the variable optical amplifier 4150 using the control signal 32. The controller 4140 controls the output light intensity so that the coefficients A and B in formula (11) may satisfy the condition of A≠B on the receiving side, which makes it possible to mitigate the fade that occurs in the signal subjected to photoelectric conversion on the receiving.

As mentioned above, according to the free space optical communication system 5000 of the present example embodiment, it is possible to use a signal laser beam to transmit an information signal as a beacon beam. It is possible to transmit the beacon beam stably at low cost and maintain stable tracking. In addition, it becomes possible to mitigate the influence of the atmospheric turbulence on the uplink signal laser beam and avoid the influence of the interference. As a result, it is possible to stabilize signal communication.

The whole or part of the example embodiments disclosed above can be described as, but not limited to, the following supplementary notes.

(Supplementary note 1) A free space optical transmitter, comprising: a laser beam transmitting means for transmitting a plurality of laser beams capable of interfering with each other and differing in one of an optical frequency and a time variation in a phase difference; and a wavefront control beam transmitting means for transmitting, to a free space, a plurality of wavefront control beams obtained by making each of the plurality of laser beams have a different wavefront.

(Supplementary note 2) The free space optical transmitter according to Supplementary note 1, wherein one of a difference frequency of a difference in the optical frequency between the plurality of laser beams and a frequency of a variation in the phase difference is larger than a frequency of atmospheric turbulence in the free space.

(Supplementary note 3) The free space optical transmitter according to Supplementary note 1 or 2, wherein the laser beam transmitting means includes a laser light source configured to transmit a single laser beam, an optical splitting means for splitting the single laser beam and generating a plurality of split laser beams, and a plurality of optical frequency shifting means for shifting optical frequencies of the plurality of split laser beams respectively by different frequencies.

(Supplementary note 4) The free space optical transmitter according to Supplementary note 1 or 2, wherein the laser beam transmitting means includes a laser light source configured to transmit a single laser beam, an optical splitting means for splitting the single laser beam and generating a plurality of split laser beams, and a plurality of phase modulating means for performing phase modulation on the plurality of split laser beams at different frequencies from each other.

(Supplementary note 5) The free space optical transmitter according to Supplementary note 4, wherein the phase modulating means performs phase modulation in a range not less than a phase amount corresponding to one wavelength of the split laser beam at a frequency larger than a frequency of atmospheric turbulence in the free space.

(Supplementary note 6) The free space optical transmitter according to any one of Supplementary notes 1, 2, 3, 4, and 5, wherein the wavefront control beam transmitting means includes a mode combining means for generating a synthetic laser beam obtained by converting the plurality of laser beams into different modes orthogonal to each other respectively and combining the plurality of laser beams, and an emitting means for emitting the synthetic laser beam to a free space.

(Supplementary note 7) The free space optical transmitter according to Supplementary note 6, wherein the mode combining means converts the laser beam with one optical frequency into only one mode different from a mode of any one of the laser beam having another optical frequency and the laser beam having a different frequency of a variation in the phase difference.

(Supplementary note 8) A free space optical communication system, comprising: the free space optical transmitter according to any one of Supplementary notes 1, 2, 3, 4, 5, 6, and 7; and a free space optical receiver, wherein the free space optical receiver includes a light collecting means for collecting received light including a received laser beam of the wavefront control beam having propagated through the free space, an optical band-pass means for letting the received laser beam among the received light through, and an optical receiving means for performing photoelectric conversion on the received laser beam.

(Supplementary note 9) The free space optical communication system according to Supplementary note 8, wherein the free space optical receiver includes a receiving-side laser light source configured to transmit a monitoring laser beam, and a receiving-side emitting means for emitting the monitoring laser beam to a free space, and the free space optical transmitter includes a light intensity adjusting means for varying each intensity of the plurality of laser beams, a transmitting-side light collecting means for collecting a received monitoring laser beam of the monitoring laser beam after having propagated through the free space, a mode separating means for separating the received monitoring laser beam into different modes orthogonal to each other and generating a plurality of monitoring mode beams, a monitoring optical receiving means for performing photoelectric conversion on each of the plurality of monitoring mode beams and generating a monitoring signal, and a control means for controlling the light intensity adjusting means based on the monitoring signal.

(Supplementary note 10) A free space optical communication method, comprising: in a first communication station, generating a plurality of laser beams capable of interfering with each other and differing in one of an optical frequency and a time variation of a phase difference; and transmitting, to a free space, a plurality of wavefront control beams obtained by making each of the plurality of laser beams have a different wavefront; and in a second communication station configured to communicate with the first communication station, collecting received light including a received laser beam of the wavefront control beams having propagated through the free space; extracting the received laser beam from the received light; and performing photoelectric conversion on the received laser beam.

(Supplementary note 11) The free space optical transmitter according to any one of Supplementary notes 1 to 5, wherein the wavefront control beam transmitting means includes: a mode combining means for generating a combined laser beam obtained by converting the plurality of laser beams into different modes orthogonal to each other, respectively, and combining the modes; a multi-mode waveguide means for guiding the combined laser beam; and an emitting means for emitting the combined laser beam to a free space.

(Supplementary note 12) The free space optical transmitter according to any one of Supplementary notes 1 to 5, wherein the wavefront control beam transmitting means includes: a plurality of optical waveguide means for respectively guiding the plurality of laser beams at a single optical mode; and an emitting means for emitting the plurality of laser beams propagating through the plurality of optical waveguide means to a free space.

(Supplementary note 13) The free space optical transmitter according to any one of Supplementary notes 1 to 12, wherein a minimum value of a frequency of a change in intensity of interference light by the plurality of laser beams is larger than 1 megahertz.

(Supplementary note 14) A free space optical communication system including the free space optical transmitter according to Supplementary note 3 or 4; and a free space optical receiver, wherein the free space optical transmitter includes an information signal generating means for generating an information signal to be transmitted, a transmitting-side high-pass means for passing only a transmission information signal having a frequency component higher than a cut-off frequency among the information signal, and an optical modulating means for generating a modulated laser beam by modulating the single laser beam based on the transmission information signal, and transmitting the modulated laser beam to the optical splitting means as the single laser beam, and the free space optical receiver includes a light collecting means for collecting received light including a received laser beam being the wavefront control beam after propagating in the free space, an optical band-pass means for passing the received laser beam among the received light, a receiving means for generating a received signal by photoelectrically converting the received laser beam, and a receiving-side high-pass means for passing only a receiving information signal having a frequency component higher than a cut-off frequency among the received signal.

(Supplementary note 15) The free space optical communication system according to Supplementary note 14, wherein the information signal generating means generates the information signal by duplexing information data with a period of a minimum frequency among frequencies of a change in intensity of interference light by the plurality of laser beams, and the free space optical receiver includes an information signal regenerating means for reproducing the information data by selecting one of duplexed components included in the receiving information signal.

(Supplementary note 16) The free space optical communication system according to Supplementary note 14 or 15, wherein a minimum value of frequencies of a change in intensity of interference light by the plurality of laser beams is larger than an upper limit of a frequency component included in atmospheric turbulence in the free space, and the cut-off frequency is larger than a maximum value of the difference frequency.

(Supplementary note 17) The free space optical communication system according to any one of Supplementary notes 14 to 16, wherein a minimum value of frequencies of a change in intensity of interference light by the plurality of laser beams is larger than 1 megahertz, and is smaller than 100 megahertz.

(Supplementary note 18) The free space optical communication method according to Supplementary note 10, wherein in the second communication station, a monitoring laser beam is generated, and the monitoring laser beam is emitted to a free space, and in the first communication station, a received monitoring laser beam being the monitoring laser beam after propagating in the free space is collected, a plurality of monitoring mode beams are generated by separating the received monitoring laser beam into different modes orthogonal to each other, respectively, a monitoring signal is generated by respectively photoelectrically converting the plurality of monitoring mode beams, and intensities of the plurality of laser beams are respectively changed, based on the monitoring signal.

(Supplementary note 19) The free space optical communication method according to Supplementary note 18, wherein in the first communication station, monitoring mode beams of two types having a large intensity of the monitoring signal are selected from among the plurality of monitoring mode beams, an intensity of the laser beam other than the laser beams of two types associated with the monitoring mode beams of the two types is attenuated among the plurality of laser beams, and intensities of the laser beams of the two types are respectively controlled in such a manner that a time variation of an intensity of the received laser beam in the second communication station is made small.

In the foregoing, the present invention is described by using the above-mentioned example embodiments as an exemplary example. The present invention, however, is not limited to the above-mentioned example embodiments. Specifically, various aspects comprehensible to a person skilled in the art are applicable to the present invention within the scope of the present invention.

REFERENCE SIGNS LIST 100, 1100, 2100, 3100, 4100, 5100 Free space optical transmitter
110 Laser beam transmitting means
120 Wavefront control beam transmitting means
1000, 2000, 3000, 4000, 5000 Free space optical communication system
1110 Laser light source
1120 Multiplexer
1130 Optical waveguide medium
1140, 2160 Transmitting-side telescope
1150, 2170 Optical amplifier
1200, 4200, 5200 Free space optical receiver
1210 Receiving-side telescope
1220 Narrowband band-pass filter (BPF)
1230 Optical Receiver
1240 Electrical filter circuit
2110 Single laser light source
2120 Optical splitter
2130 Optical frequency shifter
2140 Mode multiplexer
2150 Few mode fiber (FMF)
3140 Fanout unit
3150 Bundle fiber
4110 Transmitting-side optical splitter
4120 Mode separator
4130 Monitoring optical receiver
4140 Controller
4150 Variable optical amplifier
4210 Receiving-side laser light source
4220 Receiving-side optical splitter
5110 Signal source
5120 Signal multiplexer
5130 Transmitting-side high-pass filter (HPF)
5140 Optical modulator
5210 Signal optical receiver
5220 Receiving-side high-pass filter (HPF)
5230 Signal regenerator
11 Laser beam
12 Wavefront control beam
20 Free space
21 Atmospheric turbulence
22 Beacon beam
30 Signal laser beam
31 Monitoring laser beam
32 Control signal

The invention claimed is:

1. A free space optical transmitter, comprising:
a laser beam transmitting section configured to transmit a plurality of laser beams that are capable of interfering with each other and that differ in one of an optical frequency and a time variation in a phase difference; and
a wavefront control beam transmitting section configured to transmit, to a free space, a plurality of wavefront control beams obtained by making each of the plurality of laser beams have a different wavefront, wherein
the wavefront control beam transmitting section includes
a mode combining section configured to generate a synthetic laser beam obtained by converting the plurality of laser beams into different modes orthogonal to each other respectively and combining the plurality of laser beams, and
an emitting section configured to emit the synthetic laser beam to the free space.

2. The free space optical transmitter according to claim 1, wherein
one of a difference frequency of a difference in the optical frequency between the plurality of laser beams and a frequency of a variation in the phase difference is larger than a frequency of atmospheric turbulence in the free space.

3. The free space optical transmitter according to claim 2, wherein
the laser beam transmitting section includes
a laser light source configured to transmit a single laser beam,
an optical splitting section configured to split the single laser beam and generate a plurality of split laser beams, and
a plurality of optical frequency shifting sections configured to shift optical frequencies of the plurality of split laser beams respectively by different frequencies.

4. The free space optical transmitter according to claim 2, wherein
the laser beam transmitting section includes
a laser light source configured to transmit a single laser beam,
an optical splitting section configured to split the single laser beam and generate a plurality of split laser beams, and
a plurality of phase modulating sections configured to perform phase modulation on the plurality of split laser beams at different frequencies from each other.

5. The free space optical transmitter according to claim 1, wherein
the laser beam transmitting section includes
a laser light source configured to transmit a single laser beam,
an optical splitting section configured to split the single laser beam and generate a plurality of split laser beams, and
a plurality of optical frequency shifting sections configured to shift optical frequencies of the plurality of split laser beams respectively by different frequencies.

6. The free space optical transmitter according to claim 1, wherein
the laser beam transmitting section includes
a laser light source configured to transmit a single laser beam,
an optical splitting section configured to split the single laser beam and generate a plurality of split laser beams, and
a plurality of phase modulating sections configured to perform phase modulation on the plurality of split laser beams at different frequencies from each other.

7. The free space optical transmitter according to claim 6, wherein
the phase modulating section performs phase modulation in a range not less than a phase amount corresponding to one wavelength of the split laser beam at a frequency larger than a frequency of atmospheric turbulence in the free space.

8. The free space optical transmitter according to claim 1, wherein
the mode combining section converts the laser beam with one optical frequency into only one mode different from a mode of any one of the laser beam having another optical frequency and the laser beam having a different frequency of a variation in the phase difference.

9. A free space optical communication system, comprising:
a free space optical transmitter; and
a free space optical receiver, wherein
the free space optical transmitter includes
a laser beam transmitting section configured to transmit a plurality of laser beams that are capable of interfering with each other and that differ in one of an optical frequency and a time variation in a phase difference, and
a wavefront control beam transmitting section configured to transmit, to a free space, a plurality of wavefront control beams obtained by making each of the plurality of laser beams have a different wavefront, wherein
the free space optical receiver includes
a light collecting section configured to collect received light including a received laser beam of the wavefront control beam having propagated through the free space,
an optical band-pass section configured to let the received laser beam among the received light through, and
an optical receiving section configured to perform photoelectric conversion on the received laser beam, and wherein
the wavefront control beam transmitting section includes
a mode combining section configured to generate a synthetic laser beam obtained by converting the plurality of laser beams into different modes orthogonal to each other respectively and combining the plurality of laser beams, and
an emitting section configured to emit the synthetic laser beam to the free space.

10. The free space optical communication system according to claim 9, wherein
one of a difference frequency of a difference in the optical frequency between the plurality of laser beams and a frequency of a variation in the phase difference is larger than a frequency of atmospheric turbulence in the free space.

11. The free space optical communication system according to claim 9, wherein
the laser beam transmitting section includes
a laser light source configured to transmit a single laser beam,
an optical splitting section configured to split the single laser beam and generate a plurality of split laser beams, and
a plurality of optical frequency shifting sections configured to shift optical frequencies of the plurality of split laser beams respectively by different frequencies.

12. The free space optical communication system according to claim 9, wherein
the laser beam transmitting section includes
a laser light source configured to transmit a single laser beam,
an optical splitting section configured to split the single laser beam and generate a plurality of split laser beams, and
a plurality of phase modulating sections configured to perform phase modulation on the plurality of split laser beams at different frequencies from each other.

13. The free space optical communication system according to claim 12, wherein
the phase modulating section performs phase modulation in a range not less than a phase amount corresponding to one wavelength of the split laser beam at a frequency larger than a frequency of atmospheric turbulence in the free space.

14. A free space optical communication system, comprising:
a free space optical transmitter; and
a free space optical receiver, wherein
the free space optical transmitter includes
a laser beam transmitting section configured to transmit a plurality of laser beams that are capable of interfering with each other and that differ in one of an optical frequency and a time variation in a phase difference, and
a wavefront control beam transmitting section configured to transmit, to a free space, a plurality of wavefront control beams obtained by making each of the plurality of laser beams have a different wavefront, wherein
the free space optical receiver includes
a light collecting section configured to collect received light including a received laser beam of the wavefront control beam having propagated through the free space,
an optical band-pass section configured to let the received laser beam among the received light through, and an optical receiving section configured to perform photoelectric conversion on the received laser beam, wherein the free space optical receiver includes
- a receiving-side laser light source configured to transmit a monitoring laser beam, and
- a receiving-side emitting section configured to emit the monitoring laser beam to a free space, and wherein the free space optical transmitter includes
- a light intensity adjusting section configured to vary each intensity of the plurality of laser beams,
- a transmitting-side light collecting section configured to collect a received monitoring laser beam of the monitoring laser beam after having propagated through the free space,
- a mode separating section configured to separate the received monitoring laser beam into different modes orthogonal to each other and generate a plurality of monitoring mode beams,
- a monitoring optical receiving section configured to perform photoelectric conversion on each of the plurality of monitoring mode beams and generate a monitoring signal, and
- a controller configured to control the light intensity adjusting section based on the monitoring signal.

* * * * *